(12) United States Patent
Olalere

(10) Patent No.: US 11,418,531 B2
(45) Date of Patent: Aug. 16, 2022

(54) SYSTEM AND METHOD FOR DETERMINING CYBERSECURITY RATING AND RISK SCORING

(71) Applicant: Cyberlab Inc., Wilmington, DE (US)

(72) Inventor: Ayobami Abayomi Olalere, Brampton (CA)

(73) Assignee: Cyberlab Inc., Wilmington, DE (US)

(*) Notice: Subject to any disclaimer, the term of this patent is extended or adjusted under 35 U.S.C. 154(b) by 323 days.

(21) Appl. No.: 16/822,691

(22) Filed: Mar. 18, 2020

(65) Prior Publication Data
US 2021/0297441 A1  Sep. 23, 2021

(51) Int. Cl.
*H04L 9/40* (2022.01)
*G06F 21/57* (2013.01)

(52) U.S. Cl.
CPC ........ *H04L 63/1433* (2013.01); *G06F 21/577* (2013.01); *H04L 63/08* (2013.01); *H04L 63/1408* (2013.01); *H04L 63/1441* (2013.01); *G06F 2221/034* (2013.01)

(58) Field of Classification Search
CPC . H04L 63/1433; H04L 63/08; H04L 63/1408; H04L 63/1441; G06F 21/577; G06F 2221/034
See application file for complete search history.

(56) References Cited

U.S. PATENT DOCUMENTS

| | | | | |
|---|---|---|---|---|
| 9,294,498 | B1 * | 3/2016 | Yampolskiy | H04L 67/10 |
| 9,930,062 | B1 * | 3/2018 | Alkemper | G06F 21/577 |
| 10,102,570 | B1 * | 10/2018 | Kapczynski | G06Q 40/02 |
| 10,592,938 | B2 * | 3/2020 | Hogg | G06Q 30/0641 |
| 11,257,843 | B2 * | 2/2022 | Choi | H01L 21/76895 |
| 2014/0007242 | A1 * | 1/2014 | Carter | H04L 63/1433 |
| | | | | 726/25 |

\* cited by examiner

*Primary Examiner* — Ali S Abyaneh
(74) *Attorney, Agent, or Firm* — Christopher J. Dynowski; Ryan W. Dupuis; Ade & Company Inc.

(57) ABSTRACT

A system for deriving a rating representative of a level of cybersecurity of a user is configured to execute steps of a method comprising requesting, from the user, identifying information about the user; requesting, from the user, input in response to a set of predetermined questions provided to the user based on the identifying information about the user; collecting, based on at least the identifying information, public domain data about the user and data from the user's digital assets; and computing, based on the collected data and the input to the set of predetermined questions provided by the user, a numerical value defining the cybersecurity rating.

33 Claims, 20 Drawing Sheets

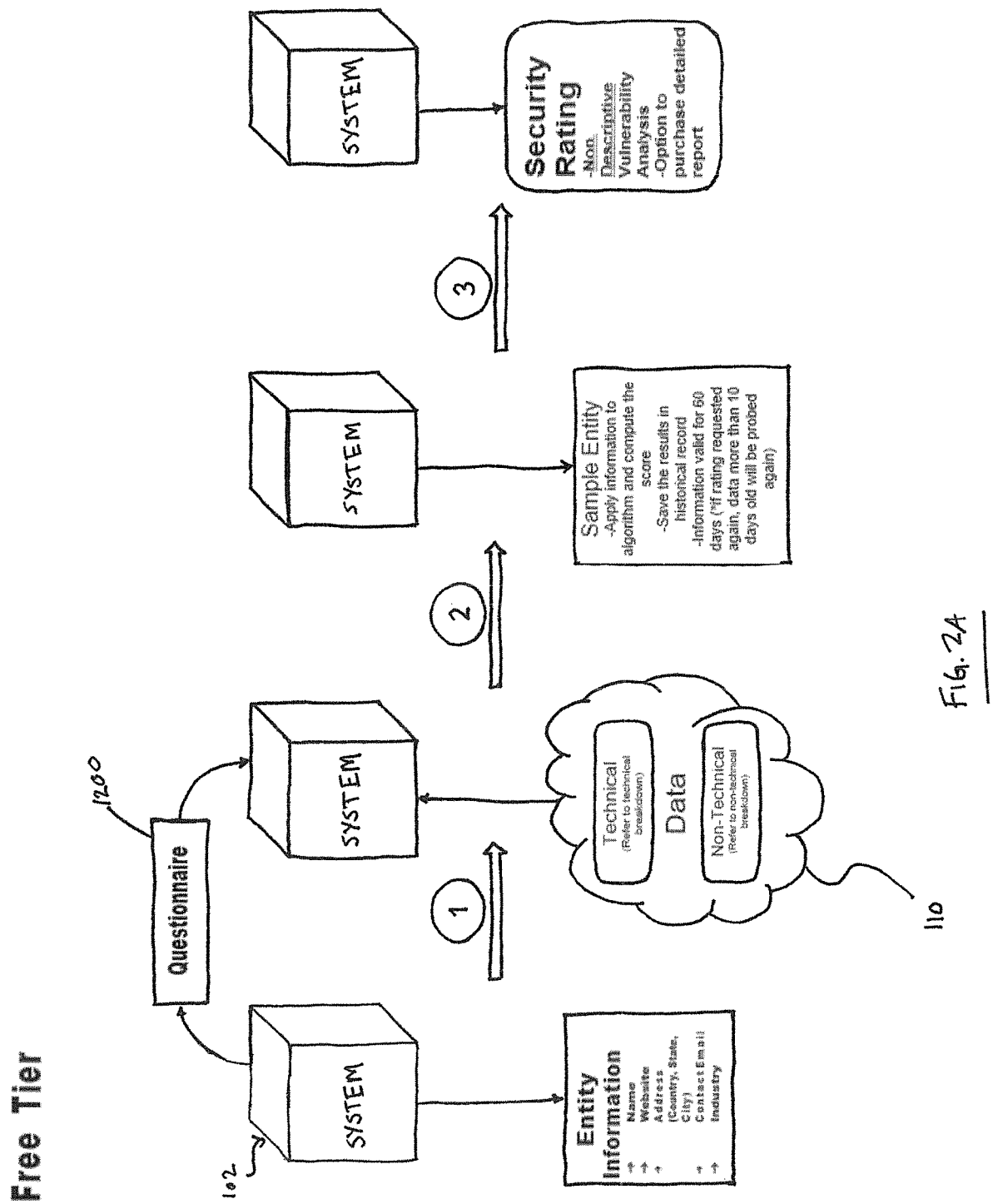

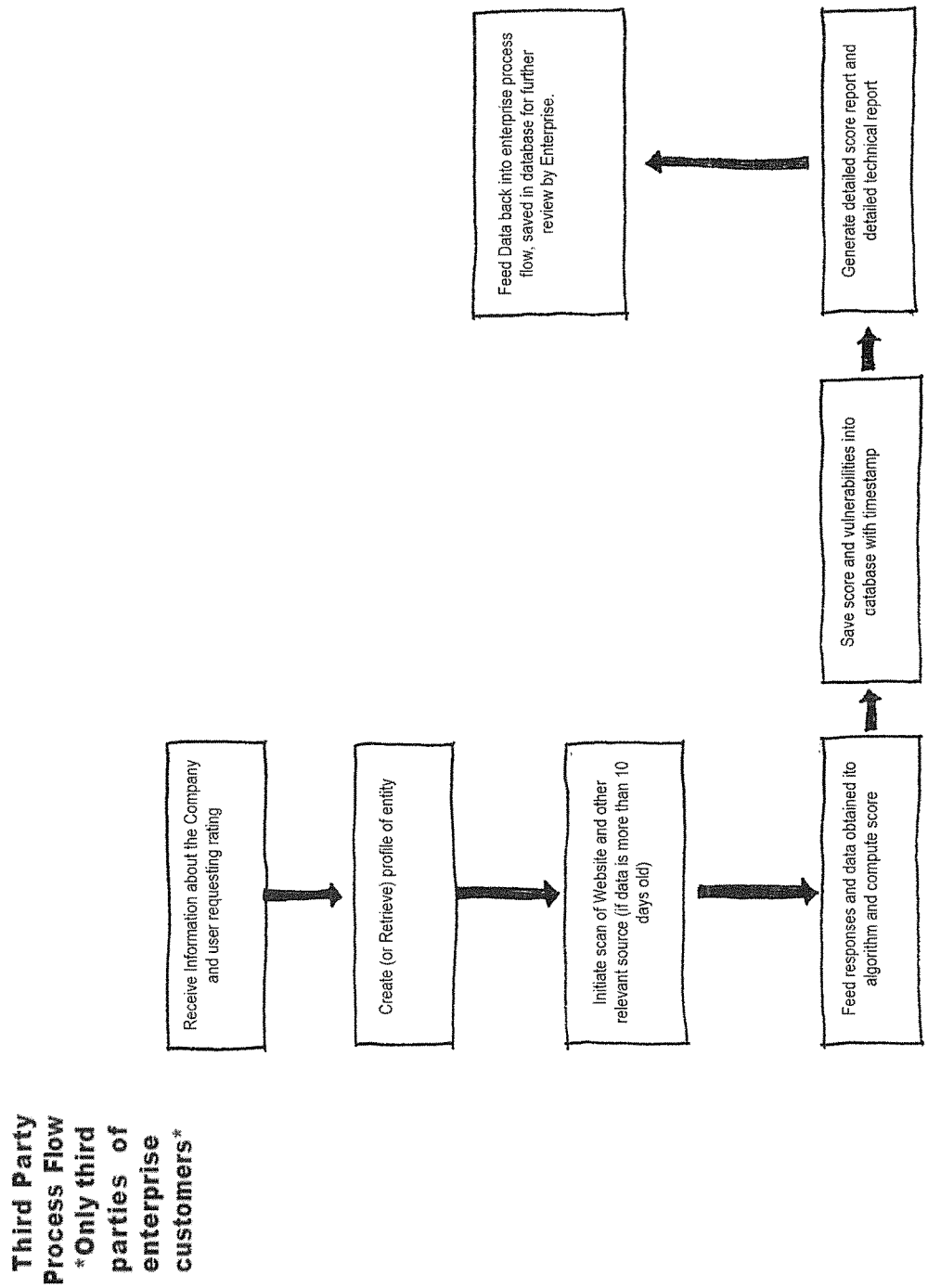

SYSTEM AND METHOD FOR DETERMINING CYBERSECURITY RATING AND RISK SCORING

FIELD OF THE INVENTION

The present invention relates to a system and method for determining a user's cybersecurity rating and risk scoring.

BACKGROUND

Cybersecurity is becoming an increasingly important topic in business as a greater number of a business organization's assets become digitized. Cyber-attacks have become existential threats to households, firms and governments of nations. Some of the factors that have fueled cybersecurity attacks which continue to threatening business continuity, businesses bottom line, privacy, investment, stock value and intellectual properties include:
- Heightened cybersecurity attacks
- Advancement in innovation and technology
- Emergence of social media
- Digital globalization
- Sponsored state cybersecurity attack
- Loss of Revenue and Reputation
- Business Continuity
- The growth of third-party cybersecurity attacks
- Fourth-party Vulnerabilities
- Cyber Fraud and mounting liabilities It therefore may be desirable to derive a readily interpretable rating of a business organization's state of cybersecurity in terms of risks and vulnerabilities, and the probability of threats exploiting the vulnerabilities.

SUMMARY OF THE INVENTION

According to an aspect of the invention there is provided a method of deriving a rating representative of a level of cybersecurity of a user comprising:
requesting, from the user, identifying information about the user;
requesting, from the user, input in response to a set of predetermined questions provided to the user based on the identifying information about the user;
collecting, based on at least the identifying information, public domain data about the user and data from the user's digital assets; and
computing, based on the collected data and the input to the set of predetermined questions provided by the user, a numerical value defining the cybersecurity rating.

According to another aspect of the invention there is provided a system for deriving a rating representative of a level of cybersecurity of a user, which is configured to execute the steps of:
requesting, from the user, identifying information about the user;
requesting, from the user, input in response to a set of predetermined questions provided to the user based on the identifying information about the user;
collecting, based on at least the identifying information, public domain data about the user and data from the user's digital assets; and
computing, based on the collected data and the input to the set of predetermined questions provided by the user, a numerical value defining the cybersecurity rating.

These arrangements may provide the following:
Cybersecurity Rating
Cybersecurity Reporting System
Executive Security Reporting
Vulnerability and Threat Analysis
Third-Party Security Assessment
Fourth-Party Security Assessment
Regulatory Assessment System
Supply Chain Security Assessment
Acquired Vulnerability Scanning &Assessment
Real-time Network Security Monitoring Assessment Tool In at least one arrangement, the public domain data about the user and the data from the user's digital assets is also collected based on the input to the set of predetermined questions provided by the user.

In at least one arrangement, the predetermined questions are associated with two or more of the group of question topics consisting of: a domain of the user, a website of the user, domain host(s), a computer network of the user, risk exposure, threat profile, vulnerabilities, security policies, data classification, regulatory requirements, industry standards, best practices, and prior risk assessment.

In at least one arrangement, the set of predetermined questions is selected based on a user type identified by the user.

In at least one arrangement, when the identifying information about the user includes at least one associate organization with which the user conducts business, the method further includes:
requesting, from each associate organization, input in response to a set of predetermined questions provided to the associate organization based on identifying information about the associate organization;
collecting, based on least the identifying information about each associate organization, public domain data about the associate organization and data from the associate organization's digital assets; and
computing, based on the collected data associated with each associate organization and the input to the set of predetermined questions provided by the associate organization, a numerical value representative of a cybersecurity rating for the associate organization.

In at least one such arrangement, when the identifying information about one or more of said at least one associate organization includes at least one associate organization with which said one or more associate organizations conduct business, the method further includes:
requesting, from each associate organization of the respective one of said at least one associate organization identified by the user, input in response to a set of predetermined questions provided to said associate organization based on identifying information about said associate organization;
collecting, based on at least the identifying information about each associate organization of the respective one of said at least one associate organization identified by the user, public domain data about said associate organization and data from said associate organization's digital assets; and
computing, based on the collected data associated with each associate organization of the respective one of said at least one associate organization identified by the user and the input to the set of predetermined questions provided by said associate organization, a numerical value representative of a cybersecurity rating for said associate organization.

In at least one such arrangement, there is an additional step of computing a numerical value representative of an aggregate cybersecurity rating for the user that is based on the computed cybersecurity rating of the user and the cybersecurity rating of each said at least one associate organization identified by the user.

In at least one arrangement, there is an additional step of generating, for the user, an entity map of the associate organizations with the cybersecurity rating values thereof indicated on the map.

In at least one arrangement, there is an additional step of generating, based on the collected data, a plurality of different reports about the level of cybersecurity of the user including an executive report and an investor's report.

In at least one arrangement, generating, for the user, a report indicating at least one of:
an industry average cybersecurity rating based on computed cybersecurity rating values for users belonging to a common business industry;
month-to-month history of the user's cybersecurity rating;
history on patching systems based on the collected data;
a predicted cybersecurity rating value for the user based on previously computed cybersecurity rating values over a prescribed period of time;
cybersecurity risk factors for the user determined based on the collected data;
an industry average risk;
industry vulnerabilities;
an indication of a possibility of attack;
a forecast of industry trends for sector specific attacks;
an average patch time for the user;
identification of select ones of the user's digital assets which are endpoints vulnerable to a cyberattack;
size of a network formed by the user's digital assets relative to select ones of the user's digital assets identified as endpoints; and
identification of select ones of the user's digital assets which are infiltration points.

In at least one arrangement, there is an additional step of determining, based on the collected data, specific ones of the user's digital assets which are critical to the user's cybersecurity's infrastructure.

In at least one arrangement, there is an additional step of identifying, based on the collected data, cybersecurity vulnerabilities of the user.

In at least one arrangement, there is an additional step of recommending, based on the collected data, resolutions to improve the user's cybersecurity.

In at least one such arrangement, there is an additional step of determining, based on the collected data, an estimated patch time.

In at least one arrangement, determining, based on the input to the set of predetermined questions, compliance of the user with data or cybersecurity legislation.

In at least one arrangement, the public domain data and the data about the user's digital assets is periodically recollected to recalculate the numerical value defining the cybersecurity rating using existing input to the set of predetermined questions.

In at least one arrangement, the identifying information includes at least two of a user's website, a domain of the website, domain host(s) and a user's business industry.

In at least one arrangement, the public domain data comprises the user's website In at least one arrangement, the numerical value defining the cybersecurity rating expires after a prescribed time period after a date on which the public domain data and the data about the user's digital assets was collected.

In at least one arrangement, the numerical value lies in a predetermined range having a lower limit and an upper limit.

In at least one arrangement, there is an additional step of storing the computed numerical value that is representative of the cybersecurity rating for subsequent retrieval within a prescribed time period after a date on which the public domain data and the data about the user's digital assets was collected.

In at least one arrangement, requesting, from the user, the identifying information about the user comprises retrieving a stored profile for the user containing the identifying information.

In at least one arrangement, the collected public domain data comprises data from the dark web.

In at least one arrangement, the collected data further includes at least one of (i) data associated with business objectives of the user, (ii) intelligence gathered about potential threats to the user, (iii) information about the user's supply chain, and (iv) people of interest to the user.

In at least one arrangement, the collected data about the user's digital assets includes at least one of (i) detection of malware in the user's digital assets, (ii) strength of authentication to access the user's digital assets, (iii) assessment of the user's secure socket layer, (iv) heartbleed, (v) detection of phishing attacks, (vi) social engineering, and (vii) real-time network monitoring.

In at least one arrangement, collecting the data about the user's digital assets comprises real-time monitoring of the user's network using a peripheral device operatively connected thereto and operatively communicated with the system.

In at least one arrangement, the input to at least some of the predetermined questions is in the form of text entered into a field by the user.

In at least one arrangement, the input to at least some of the predetermined questions is in the form of a user-selection of at least one of a plurality of provided predetermined answers for a respective one of the predetermined questions.

In at least one arrangement, the step of collecting the public domain data and the data from the user's digital assets is performed in a plurality of serial phases including reconnaissance, enumeration, vulnerability assessment, penetration testing and risk assessment, wherein:
the reconnaissance phase comprises gathering technical and non-technical data about the user;
the enumeration phase comprises extracting data from the user's digital assets representative of vulnerabilities in the user's digital assets;
the vulnerability assessment phase comprises checking predetermined cybersecurity factors indicative of the vulnerabilities of the user's digital assets;
the penetration testing phase comprises performing predetermined cybersecurity tests on the user's digital assets to measure the user's cybersecurity; and
the risk assessment phase comprises determining, based on the collected data, susceptibility to a cyberattack.

In at least one arrangement, the reconnaissance phase comprises gathering at least one of (i) host system information, (ii) geo information, (iii) secure socket layer (SSL) certification, (iv) nmap and operating system (OS) detection, (v) nslookup, (vi) exposed email addresses, (vii) history of the user's domain on blacklists, and (viii) history of the user's domain distributing malware.

In at least one arrangement, the enumeration phase comprises performing at least one of (i) website security vulnerability header analysis, (ii) php vulnerability assessment, (iii) vhost scanning, (iv) exposed files from the user's domain, (v) directory listing and enumeration, (vi) wayback machine scanning for exposed files or information, (vii)

subdomain enumeration to identify unintentionally exposed internal directories of the user, and (viii) wordpress scanning.

In at least one arrangement, the vulnerability assessment phase comprises performing at least one of (i) openSSL heartbleed, (ii) malware distribution and malware infection check, (iii) SSL mitm analysis and verification, (iv) SSL weak or comprised key assessment, (v) XSS scanning and vulnerability assessment, and (vii) PHP weakness testing.

In at least one arrangement, the penetration testing phase comprises performing at least one of (i) brute force logins and (ii) exploitation analysis.

BRIEF DESCRIPTION OF THE DRAWINGS

The invention will now be described in conjunction with the accompanying drawings in which:

FIGS. 2A through 2C show a flow of information through the system, a flowchart of steps carried out by the system, and a flowchart of steps carried out by the user, respectively, in a first variant of the method of the present invention which is referred to as a free tier, provided to a non-paying user;

FIGS. 4A through 4D show a flow of information through the system, a flowchart of steps carried out by the system, a flowchart of steps carried out by the user, and a flowchart of steps carried out by a third party related to the user, respectively, in a third variant of the method of the present invention which is referred to as an enterprise tier, provided to a second, higher tier of paying user;

In the drawings like characters of reference indicate corresponding parts in the different figures.

DETAILED DESCRIPTION

Figure 1A:
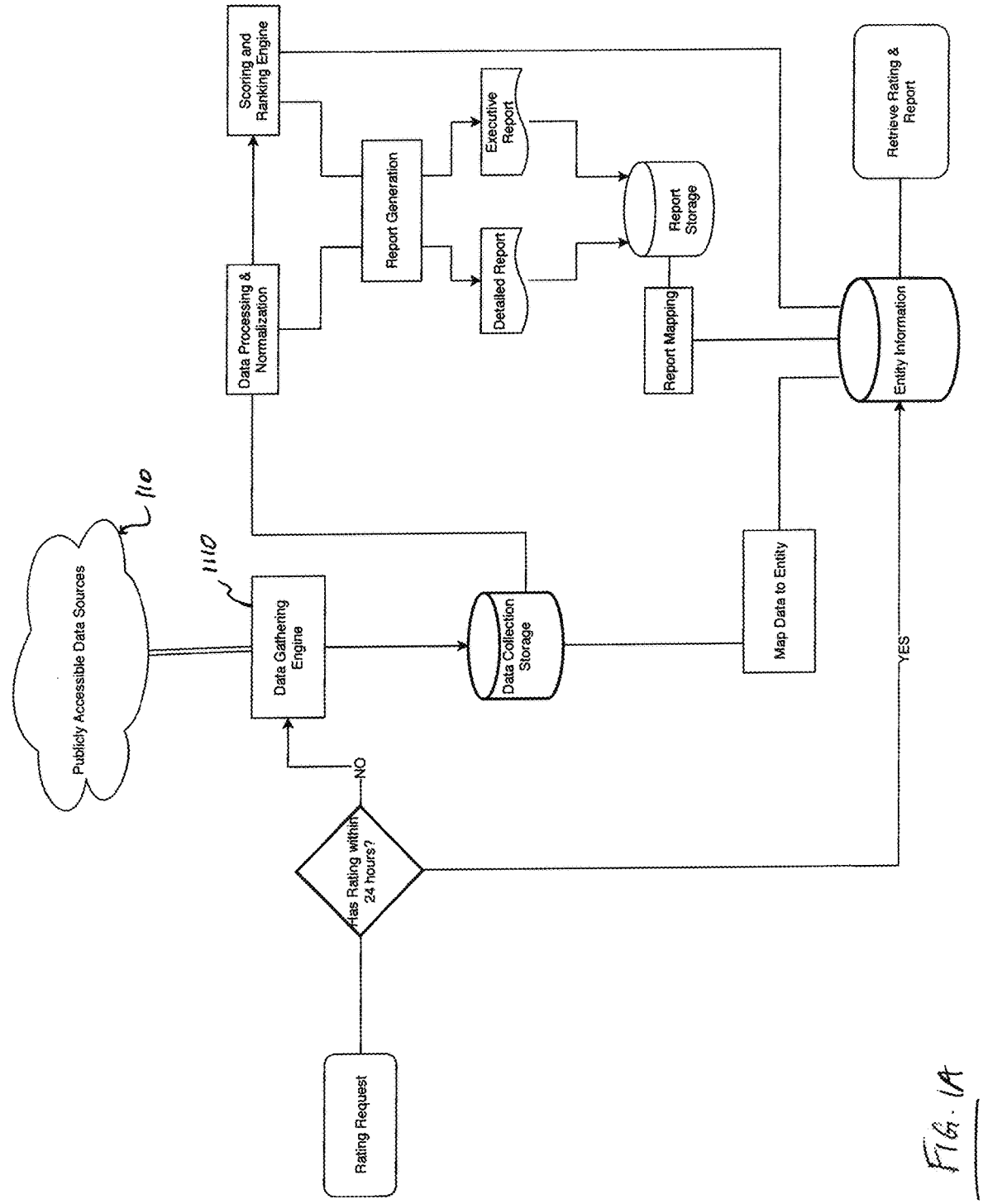
FIG. 1A is a schematic diagram showing both components of a system configured to execute the method of the present invention and steps of this method.
Figure 1B:
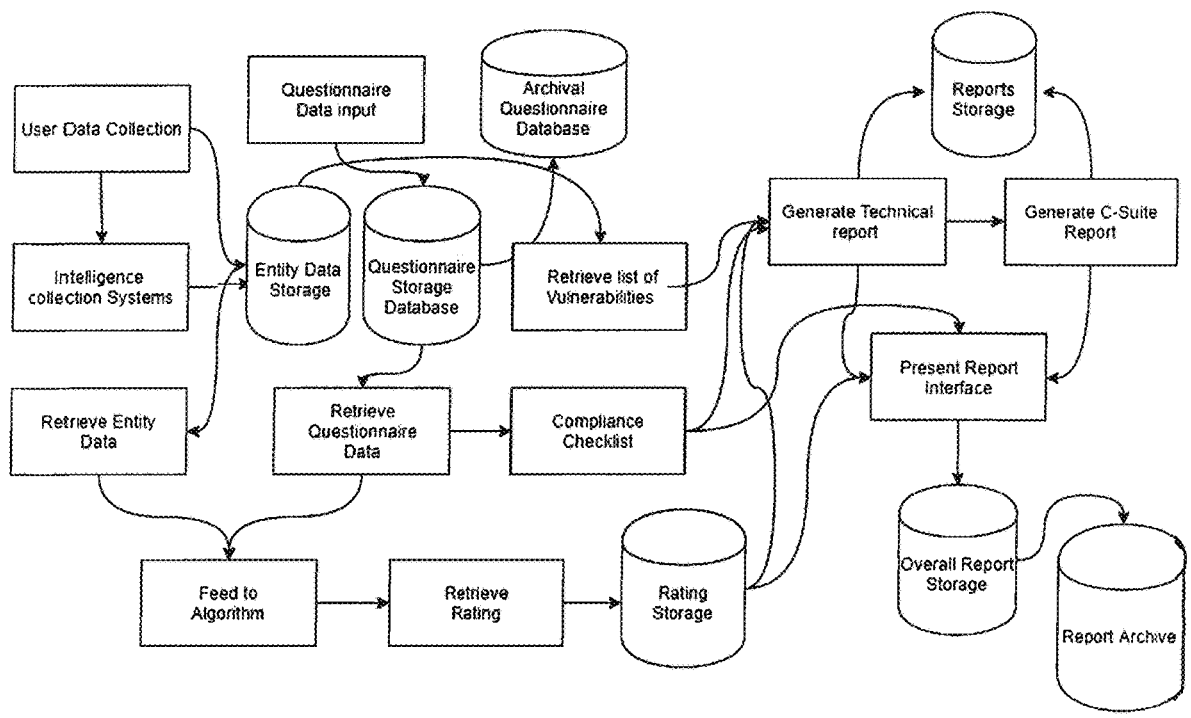
FIG. 1B is a flow diagram of the method as represented in FIG. 1A.
Figure 2B:
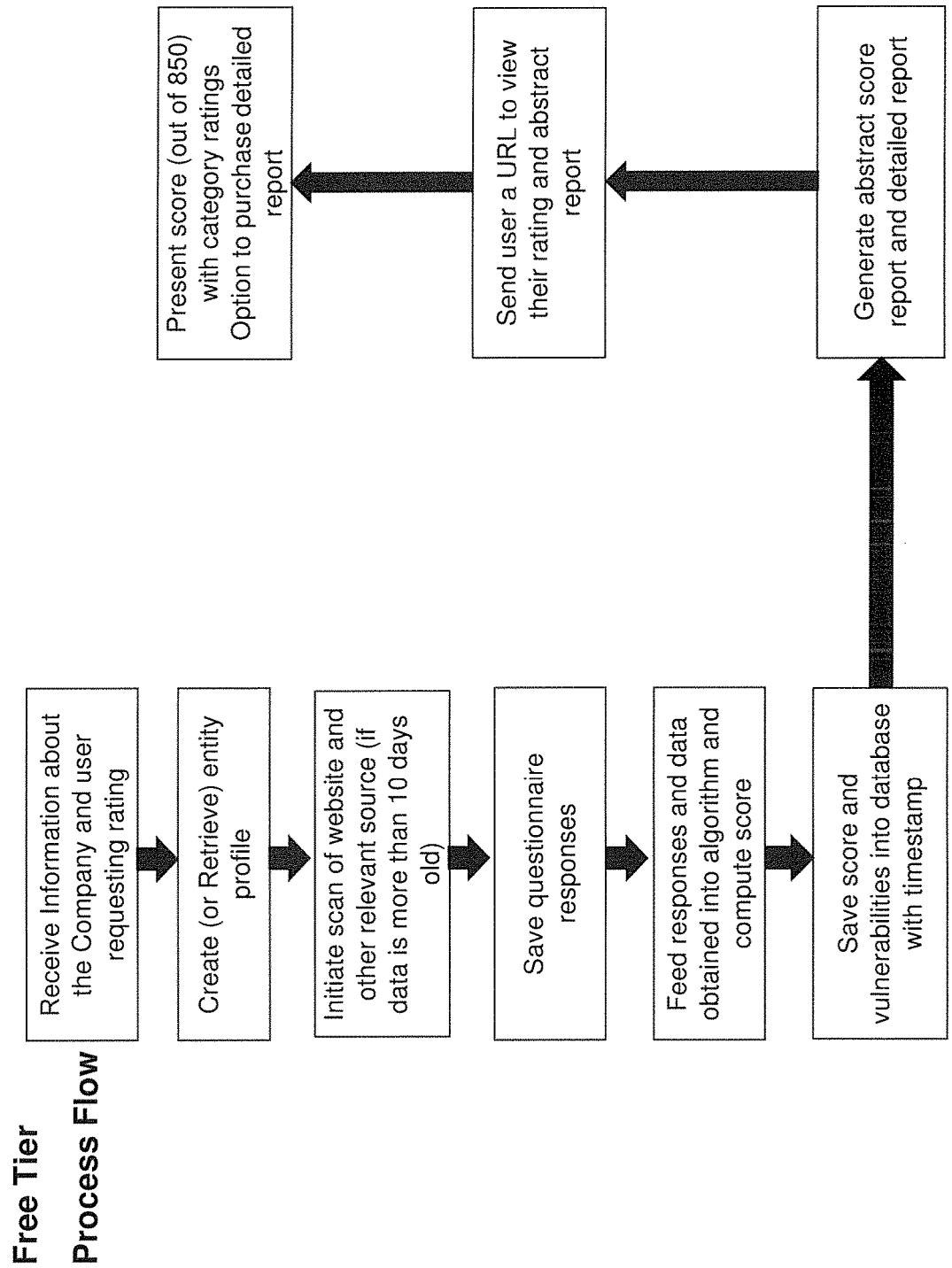
Figure 2C:
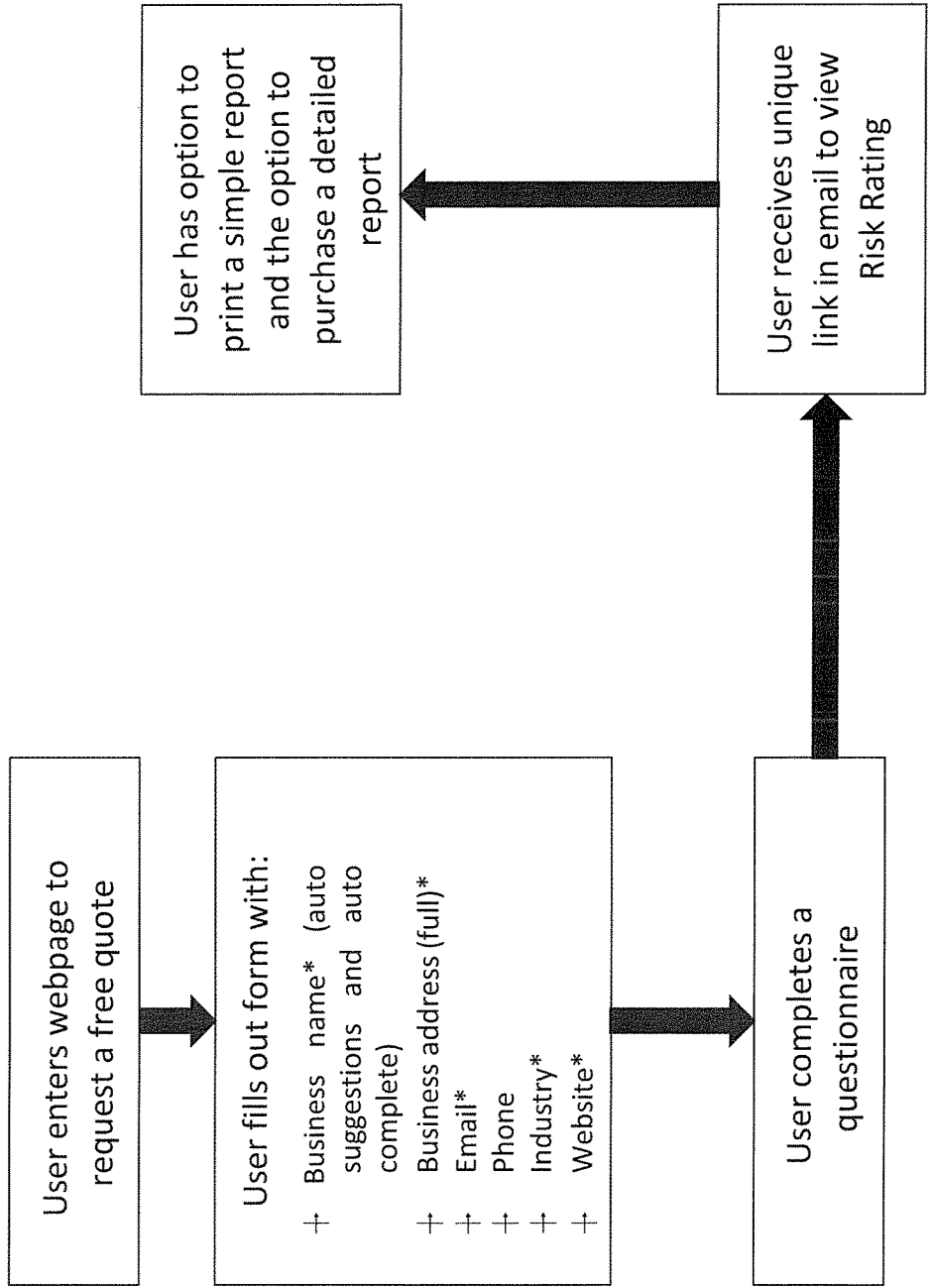
Figure 3A:
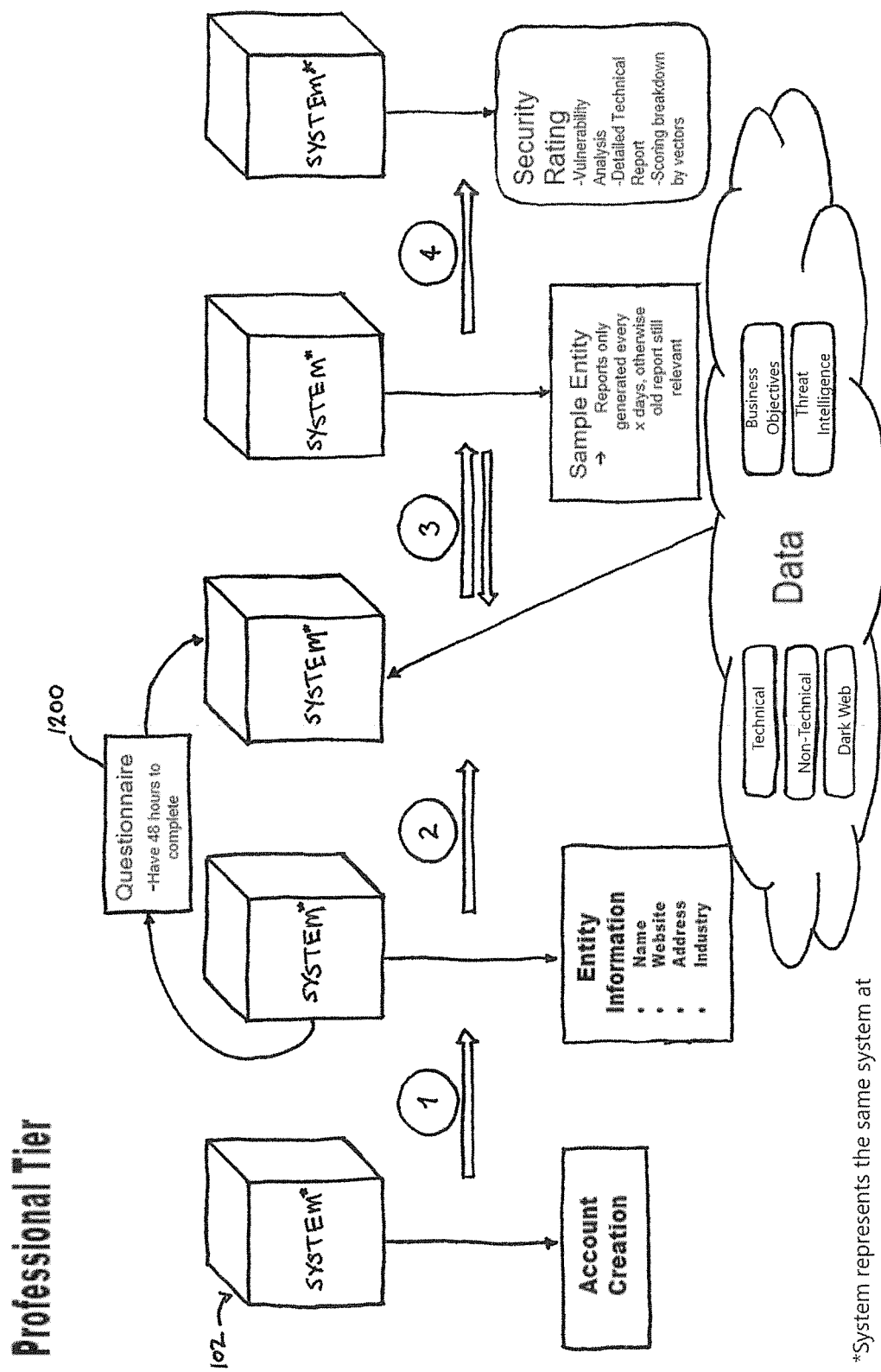
FIGS. 3A through 3C show a flow of information through the system, a flowchart of steps carried out by the system, and a flowchart of steps carried out by the user, respectively, in a second variant of the method of the present invention which is referred to as a professional tier, provided to a first tier of paying user.
Figure 3B:
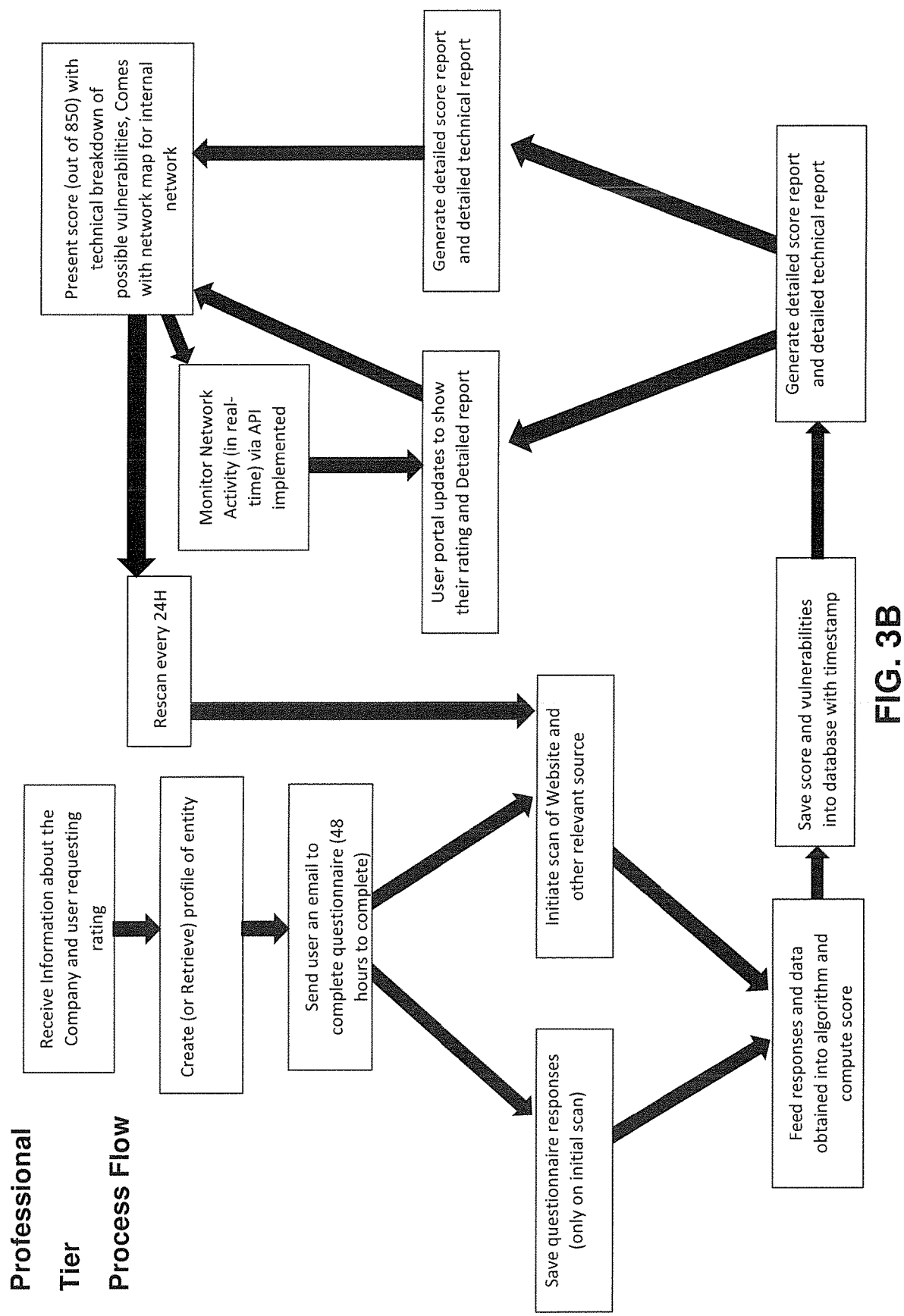
Figure 3C:
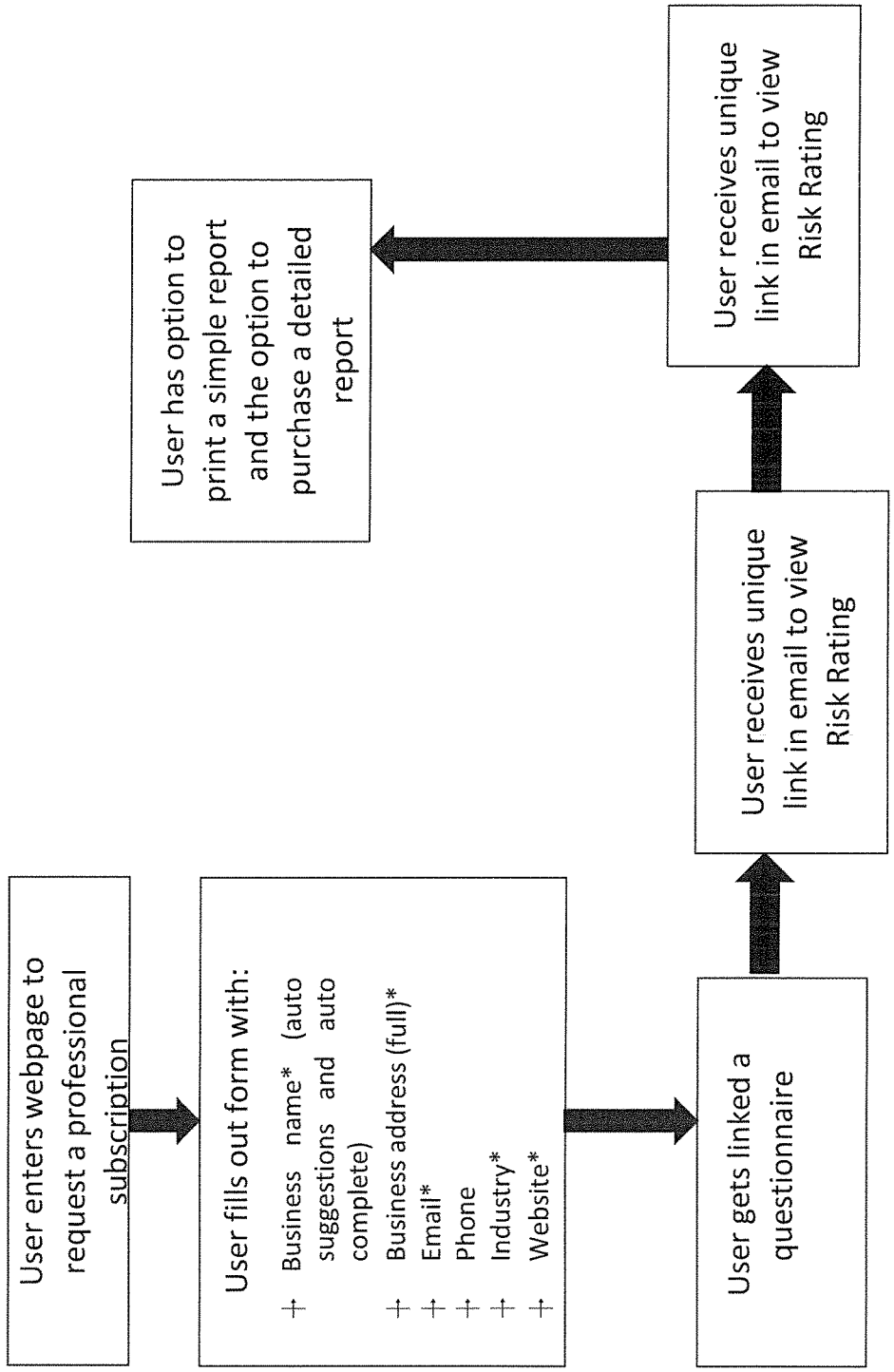
Figure 4A:
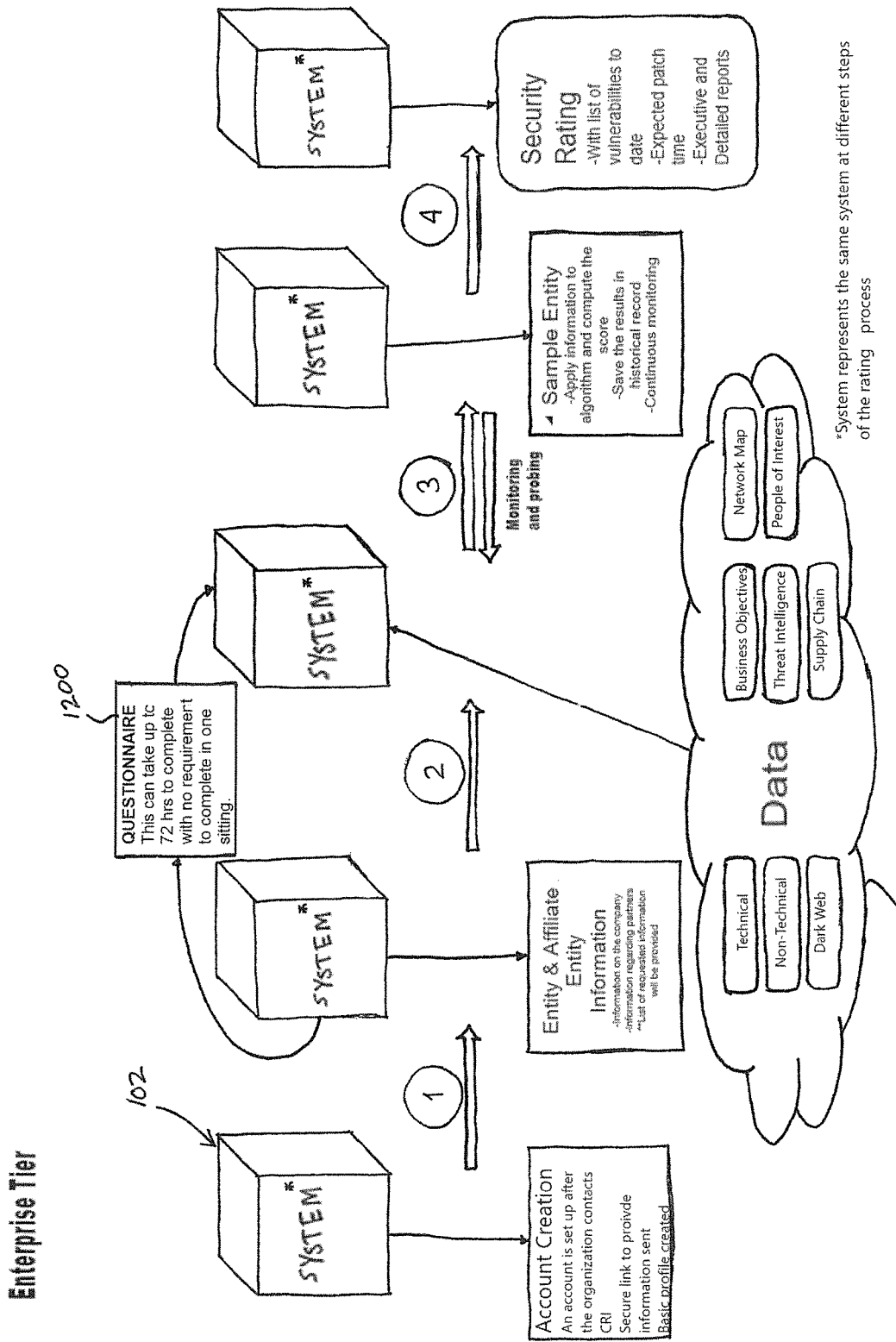
Figure 4B:
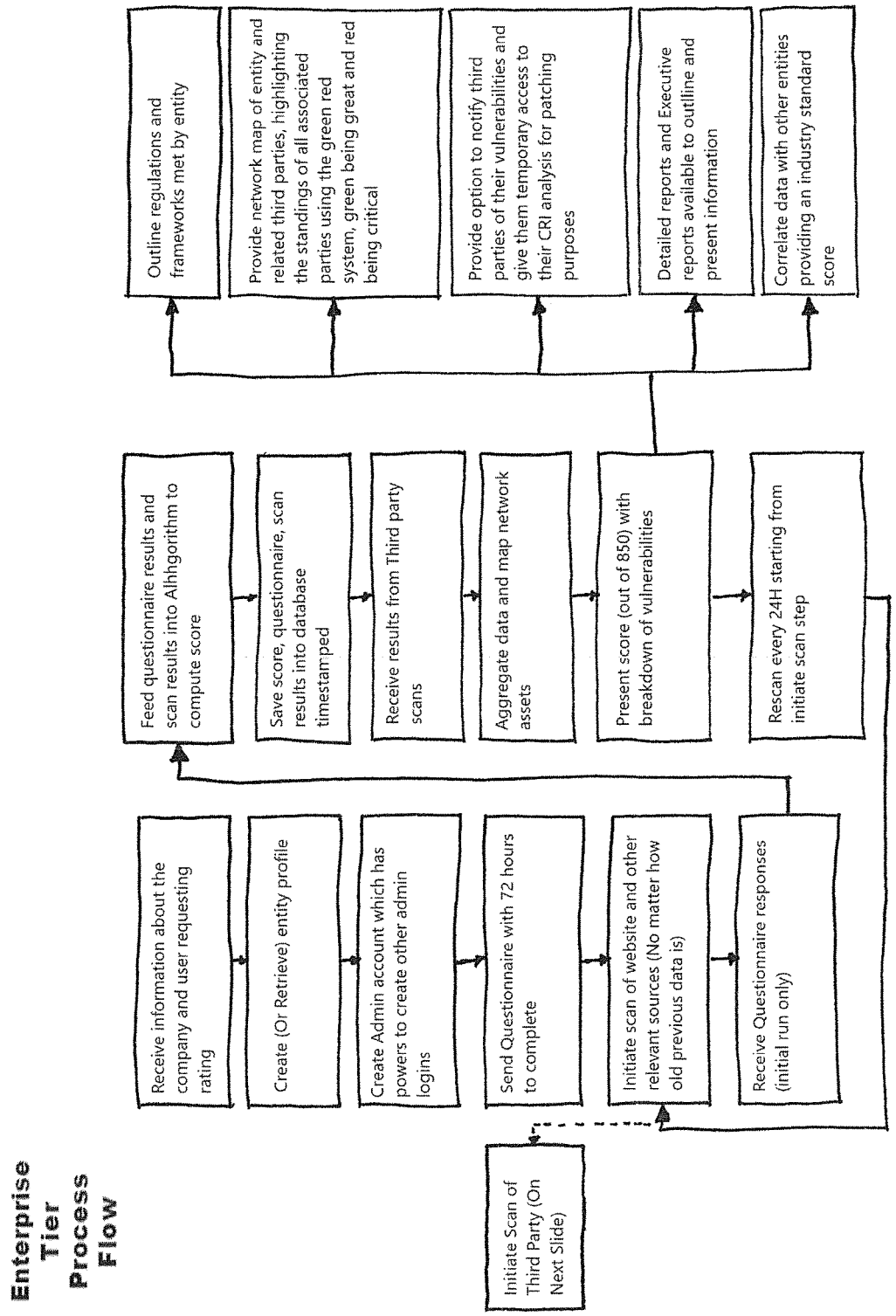
Figure 4C:
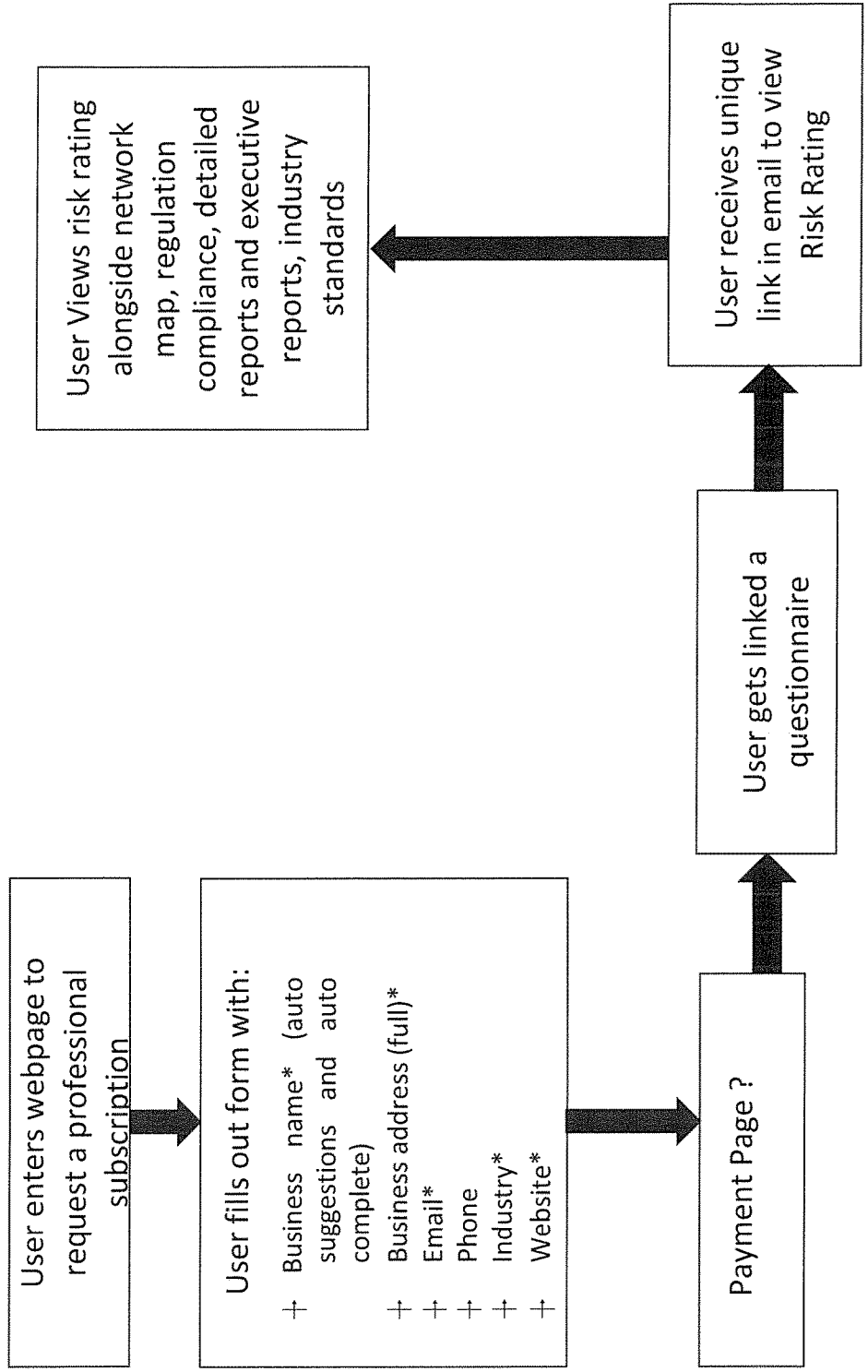

Referring to the accompanying figures, there is shown a system and method for deriving a rating representative of a level of cybersecurity of a user or requestor. The method, which is executable on the appropriately configured system, comprises the steps of:

requesting, from the user, identifying information about the user;

requesting, from the user, input in response to a set of predetermined questions provided to the user based on the identifying information about the user;

collecting, based on at least the identifying information, public domain data about the user and data from the user's digital assets; and computing, based on the collected data and the input to the set of predetermined questions provided by the user, a numerical value defining the cybersecurity rating.

The user-identifying information particularly includes a user's website, which is used to direct the step of collecting data about the user particularly the public domain portion of the collected data, and a user's business industry which enables the cybersecurity rating value computed by the system, and possibly other data collected about the user such as a domain of the user's website and a host of the domain, to be organized in a database according to business industry for subsequent derivation of values representative of a particular industry. The user-identifying information also includes a name of the user, address, and contact email address.

In certain variants of the system and method, the user-identifying information may be provided thereto in a profile or account creation step where this information is stored by the system for subsequent retrieval at a later time, for example if the same user wishes to selectively retrieve an up-to-date cybersecurity rating. Thus, in this instance, the step of requesting user-identifying information may comprise requesting, from the user, login information associated with a previously created user profile for retrieval thereof by the system.

At this step, the user is also identified by a user type, namely one of a free tier user which is a non-paying user who selectively engages the system to derive a cybersecurity rating upon request; a professional tier user which is a first tier of paying user, typically a small to medium-sized company, who subscribes to the system so as to periodically receive an updated cybersecurity rating after engaging the system a first time; and an enterprise tier user which is a second, higher tier of paying user, typically a large corporation which may be publicly traded and which may have established business relations with associate organizations who are a third-party to the user, who like the professional tier user also subscribes to the system for periodic updates about their cybersecurity rating.

After providing the identifying information, the user is prompted by the system to answer a questionnaire comprising a set of predetermined questions which allow the system to characterize the user in terms of their cybersecurity profile or behaviour. The system has stored thereon a plurality of predetermined questionnaires each suited for a different user type, and thus the system provides to the user a selected one of the questionnaires based on the identified user-type. The predetermined questions are associated with two or more of the group of question topics consisting of: a domain of the user, a host of the user's domain, a website of the user, a computer network of the user, risk exposure, threat profile, vulnerabilities, security policies, data classification, regulatory requirements, industry standards, best practices, and prior risk assessment.

The input provided by the user to at least some of the predetermined questions is in the form of a user-selection of at least one of a plurality of provided predetermined answers for a respective one of the predetermined questions. In other words, some of the questions are basically of a multiple-choice style or type. Additionally, the input to at least some of the predetermined questions may be in the form of text entered into a field by the user.

In the first variant of method for the free tier user, the questionnaire is provided to the user in parallel to performing the step of collecting data about the user, such that the user is generally in the process of answering the questionnaire while the system is scanning the public domain data, primarily the user's provided website, and the user's digital assets which are accessible by the system over the Internet based on existing Internet connections.

In the second and third variants of method for professional or enterprise tier users, the system solicits response from the user to the provided questionnaire before commencing the data collection step. Thus the data collection step is serial to the user-characterisation step, defined by requesting from the user completion of the provided questionnaire, as the step of collecting data is directed in part by the user's input or responses to the provided questions.

After receiving the user-identifying information, the system performs the step of collecting data about the user. The data to be collected is determined by the user-identifying information and in some instances also by the user-input to the questionnaire. The data which is collected includes that which is public domain, meaning data which is accessible over the Internet by any member of the public including data that is not stored locally on the user's digital assets, and that which is obtained by probing the user's digital assets over the Internet using existing connections. One way in which the user's digital assets may be probed by the system is by accessing the same over the Internet to identify exposed assets, that is assets which are not suitably obstructed from external access by unauthorized users outside a network formed by the user's digital assets. Another way may be by, basically, conducting one or more cyberattacks on the user's digital assets.

The data which is collected about the user includes technical and non-technical data. Technical data refers to data which can be expressed in conventional computer terminology, or in other words, with respect to known computing concepts. Non-technical data refers to data which is suggestive of a user's level of cybersecurity but cannot be expressed directly in terms of computing concepts. Most if not all of the public domain data which is gathered is of the non-technical type.

In certain variants of the method, the collected data about the user's digital assets includes at least one of (i) detection of malware in the user's digital assets, (ii) strength of authentication to access the user's digital assets, (iii) assessment of the user's secure socket layer, (iv) heartbleed, which is a security bug in the OpenSSL cryptography library enabling a large amount of memory (RAM) to be accessed thereby potentially disclosing passwords and private keys, (v) detection of phishing attacks, (vi) social engineering, which refers to an attack vector that relies heavily on human interaction and often involves manipulating people into breaking normal security procedures and best practices in order to gain access to systems, networks or physical locations, or for financial gain; and (vii) real-time network monitoring.

In certain variants of the method, usually for paying tier users, the system is configured to collect data about the user's digital assets using a peripheral device D operatively connected to the user's network and that is operatively communicated with the system, so as to conduct real-time monitoring of the user's network. This may provide an additional source of data for consideration by the system in computing the numerical cybersecurity rating, or more instantaneous data to be used in computing the rating or score.

In certain variants of the method, the collected data also includes at least one of (i) data associated with business objectives of the user, (ii) intelligence gathered about potential threats to the user, (iii) information about the user's supply chain, and (iv) people of interest to the user.

In certain variants of the method, for example for professional or enterprise tier users, the collected public domain data comprises data from the dark web which is not discoverable or indexed by Internet search engines and requires use of an anonymizing browser to be accessed.

Generally speaking, the step of collecting the public domain data and the data from the user's digital assets is performed in a plurality of serial phases including reconnaissance, enumeration, vulnerability assessment, penetration testing, and risk assessment. These phases are conducted one after the other, upon completion of the earlier phase, in the order listed.

The reconnaissance phase comprises gathering including technical and non-technical data about the user. The reconnaissance phase may comprise gathering at least one of (i) host system information, (ii) geo information, (iii) secure socket layer (SSL) certification, (iv) nmap and operating system (OS) detection, (v) performing nslookup (name server lookup) which is a network administration command-line tool available in many computer operating systems for querying the Domain Name System (DNS) to obtain domain name or IP address mapping, or other DNS records, (vi) exposed email addresses, (vii) history of the user's domain on blacklists, and (viii) history of the user's domain distributing malware, wherein items (vii) and (viii) may be facilitated by WHOIS protocol.

The enumeration phase comprises extracting data such as user names, machine names, network resources, shares and services from a user's digital assets which is representative of vulnerabilities or weak points in the digital assets' security and which may be exploited to gain access to the digital assets. The enumeration phase may comprise performing at least one of (i) website security vulnerability header analysis, (ii) php vulnerability assessment, (iii) vhost scanning, (iv) exposed files from the user's domain, (v) directory listing and enumeration, (vi) wayback machine scanning for exposed files or information, (vii) subdomain enumeration to identify unintentionally exposed internal directories of the user, and (viii) wordpress scanning.

The vulnerability assessment phase comprises, using the system, checking predetermined cybersecurity factors which are indicative of the vulnerabilities of the user's digital assets identified in the enumeration phase. The vulnerability assessment phase may comprise performing at least one of (i) OpenSSL heartbleed, (ii) malware distribution and malware infection check, (iii) SSL mitm analysis and verification, (iv) SSL weak or comprised key assessment, (v) XSS scanning and vulnerability assessment, and (vii) PHP weakness testing.

The penetration testing phase comprises, using the system, performing predetermined cybersecurity tests on the user's digital assets to measure strength of the user's existing cybersecurity protection. The penetration testing phase comprises performing at least one of (i) brute force logins and (ii) exploitation analysis.

The risk assessment phase comprises determining, based on the collected data, susceptibility to a cyberattack.

The collected data is stored on the system for subsequent retrieval and/or use in computing comparison metrics.

In certain variants of the method, for example for professional or enterprise tier users, the data collection step may be periodically conducted depending on a timestamp of a previous scan, so that input data for computing the cybersecurity rating is up-to-date. In such instances, typically the user is not prompted to provide an updated set of answers to the questionnaire as this is less likely to have changed from the previously conducted scan.

Once the data has been collected about the user, the system computes a numerical value, which lies in a predetermined range having a lower limit such as 300 and an upper limit 850, and which defines the cybersecurity rating of the user. This provides a definite and discrete way to measure the user's cybersecurity level. This computation is based on the collected data, and typically also is based on the user-input to the provided questionnaire.

At this step, the system also identifies a set of vulnerabilities of the user based on the input data used to compute the user's cybersecurity rating.

The computed results are stored on the system for subsequent retrieval and/or use in computing comparison metrics.

In certain variants of the method, such as for enterprise tier users, the user-identifying information includes at least one associate organization with which the user conducts business. In such instances, the method further includes the steps of:

optionally, requesting, from each associate organization, identifying information about the associate organization;

requesting, from each associate organization, input in response to a set of predetermined questions provided to the associate organization based on the identifying information about the associate organization which, instead of being received from the associate, may have been received from the user at the time of inputting the user-identifying information;

collecting, based on at least the identifying information about each associate organization and preferably also on the input to the set of predetermined questions from the associate organization, public domain data about the associate organization and data from the associate organization's digital assets; and computing, based on at least the collected data associated with each associate organization and preferably also on the input to the set of predetermined questions provided by the associate organization, a numerical value representative of a cybersecurity rating for the associate organization.

In this way, another cybersecurity rating can be computed for the user based on the user's cybersecurity rating and that for each associate organization of the user so as to provide for the user an aggregate cybersecurity rating which accounts for other businesses that may have in their possession or access to confidential business information or the digital assets of the user.

The cybersecurity rating of the associate organization is computed distinctly of the user's, and is stored for subsequent retrieval or use, such that this information can be displayed to the user individually of their standalone rating that excludes the cybersecurity level or state of their associates, and furthermore so that this information can be provided to the corresponding associate organization at the request of the user.

Furthermore, when the associate-identifying information about the at least one associate organization of the user includes at least one associate organization with which the user's direct associate organization conduct business, so as to be an indirect associate of the user, the method further includes the steps of:

optionally, requesting, from each indirect associate organization, identifying information about the indirect associate organization;

requesting, from each indirect associate organization, input in response to a set of predetermined questions provided to the indirect associate organization based on the identifying information about the indirect associate organization which, instead of being received from the indirect associate, may have been received from the direct associate at the time of inputting the associate-identifying information;

collecting, based on at least the identifying information about each indirect associate organization and preferably also on the input to the set of predetermined questions from the indirect associate, public domain data about the indirect associate and data from the indirect associate's digital assets; and computing, based on at least the collected data associated with each indirect associate organization and preferably also on the input to the set of predetermined questions provided by the indirect associate, a numerical value representative of a cybersecurity rating for the indirect associate.

Although the indirect associate's cybersecurity rating is distinctly computed, it is typically incorporated into the user's direct associate's cybersecurity rating such that the direct associate's cybersecurity rating is an aggregate type of cybersecurity rating. The indirect associate's cybersecurity rating is generally not displayed or provided to the user.

In certain variants of the method where the system automatically periodically recollects data, the numerical value defining the user's cybersecurity rating is recalculated using the most recently collected data and existing, previously provided input to the questionnaire. In conjunction therewith, the user's cybersecurity rating expires after a prescribed time period after a date on which the public domain data and the data about the user's digital assets was collected, such that it has a limited period of validity.

Further to computation of cybersecurity ratings for the user, the system displays to the user their cybersecurity rating and preferably identifies, based on at least the collected data and optionally also on the input to the provided questionnaire, the user's cybersecurity vulnerabilities such that the numerical rating is interpretable and distinguishable from other permutations of a cybersecurity level for which the same numerical value may be derived.

Moreover, after the cybersecurity rating for the user is computed, in certain variants of the method, the system also:

determines, based on at least the collected data and optionally also on the input to the provided questionnaire, specific ones of the user's digital assets which are critical to the user's cybersecurity;

recommends, based on at least the collected data and optionally also on the input to the provided questionnaire, resolutions to improve the user's cybersecurity;

determines, based on at least the collected data and optionally also on the input to the provided questionnaire, an estimated patch time which refers to an estimated duration of time for resolving identified vulnerabilities, which is particularly relevant when the system also identifies the user's cybersecurity vulnerabilities which may be resolved by taking appropriate action, which in the field of computer technology is referred to as 'patching';

determines, based on the input to the set of predetermined questions, compliance of the user with data or cybersecurity legislation;

generates, for the user, an entity map of the direct associate organizations with the cybersecurity rating values thereof indicated on the map.

Furthermore, the system generates a report for the user to display the cybersecurity rating and other computed or collected results in a meaningful, interpretable way so as to provide risk scoring. The system generates, based on at least the collected data and optionally also on the input to the questionnaire, a plurality of different reports about the measured level of cybersecurity of the user based on a common data set but each report is suited for a different audience and may contain different information types and level of detail. Examples of reports which may be generated by the system include an executive report which highlights aspects of the company's cybersecurity level that may affect the way in which the company conducts business, and an investor's report.

Depending on the user type, such as free tier or professional tier or enterprise tier, and the report type to be generated, the report indicates at least one of the following:

an industry average cybersecurity rating based on computed cybersecurity rating values for users belonging to a common business industry;

month-to-month history of the user's cybersecurity rating;

history on patching systems based on the collected data, that is a history of patches installed on the user's digital assets to improve cybersecurity thereof;

a predicted cybersecurity rating value for the user based on previously computed cybersecurity rating values over a prescribed period of time;

cybersecurity risk factors for the user determined based on the collected data;

an industry average risk, which considers the data collected on other users of a common industry to provide an averaged risk assessment for the user requesting the cybersecurity rating;

industry vulnerabilities, which considers the data collected on other users of a common industry to indicate, to the user requesting the cybersecurity rating, select vulnerabilities which all or a majority of user of the common industry were identified as having by the system of the present invention;

an indication of a possibility of attack;

a forecast of industry trends for sector specific attacks;

an average patch time for the user;

identification of select ones of the user's digital assets which are endpoints vulnerable to a cyberattack;

size of a network formed by the user's digital assets relative to select ones of the user's digital assets identified as endpoints; and identification of select ones of the user's digital assets which are infiltration points.

The foregoing is facilitated by multiple interacting agents namely (i) a browser or downloaded application on a device of the user 101, through which the user interacts with the system generating the numerical cybersecurity rating; (ii) the system which is configured to generate the numerical cybersecurity rating indicated at 102; (iii) the user's digital assets indicated at 104 and alternatively termed "User's Company System" in the figures for convenient reference; (iv) a third party communication provider such as a wireless data communication network indicated at 103; and (v) an entity which is a third party to the user requesting the rating from the system 102, which is indicated at 105.

Figure 5:
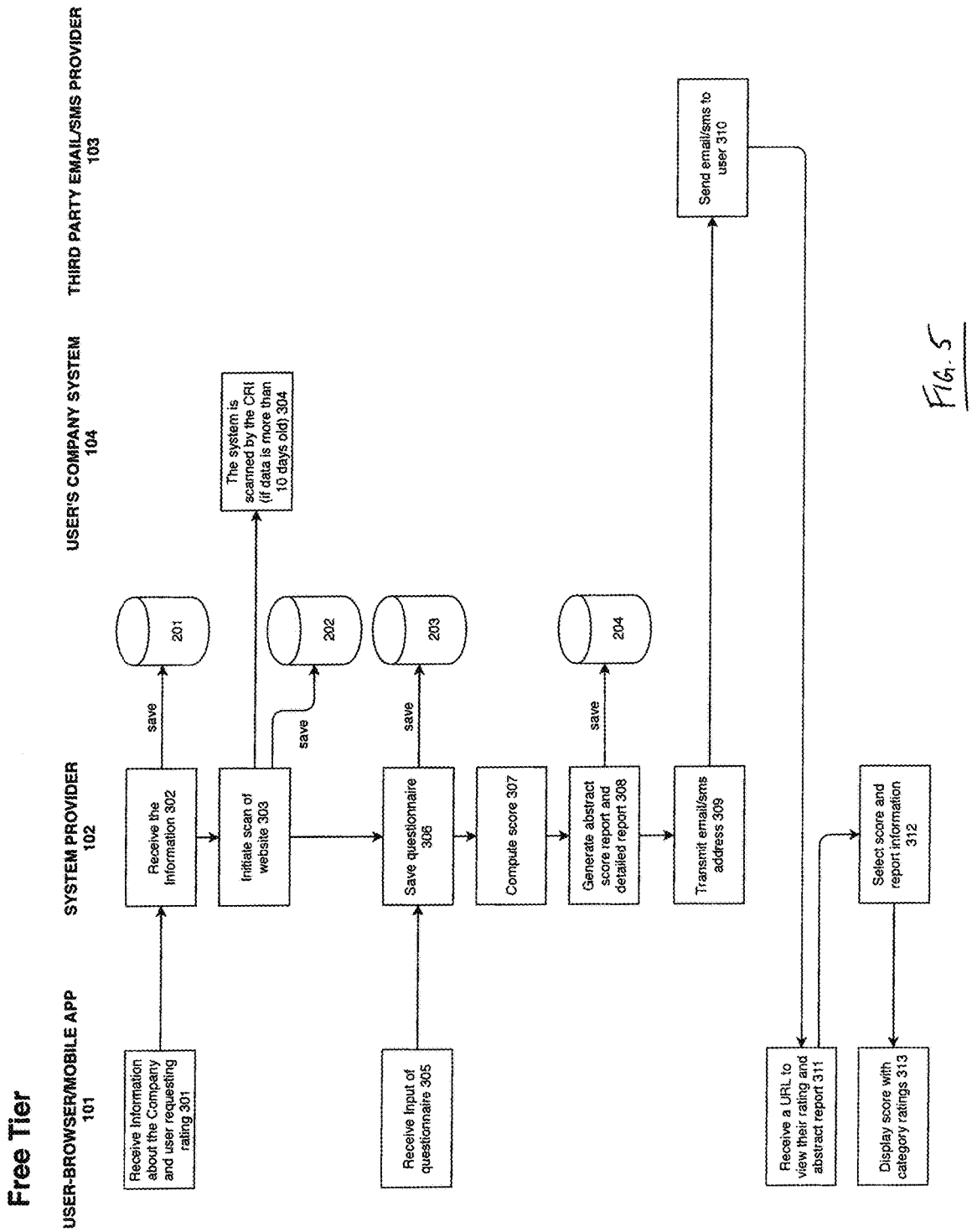
FIG. 5 is a flowchart of steps carried out by various entities involved in the first variant of the method represented by FIGS. 2A-2C.

With reference to FIG. 5, for a free tier user who does not have a profile stored on the system 102, the user 101 interacts with the system 102 via an Internet browser to provide, to the system 102, identifying information about the user requesting the rating which is indicated at 301 in FIG. 5. The system 102 receives the user's identifying information at 302 and stores the same at 201. The user-provided identifying information is sufficient for the system to conduct a scan of the website provided by the user, or more generally public domain data on the user which is available on the Internet, as indicated at step 303, and to conduct a scan of the user's digital assets as at 304 to obtain technical data. The results of the website scan from 303 are stored in the system at 202.

After providing the identifying information, the user 101 provides input to the system 102 on the system-provided questionnaire at 305, and this input is saved on the system at 306 and 203.

With the user's answers to the questionnaire and the scans of the user's digital assets, the system 102 has the data based on which to compute the numerical cybersecurity rating at 307 and generate reports at 308 of at least two types, that is an abstract score report and detailed report, which are saved on the system 102 for subsequent retrieval at 204.

Notification that the reports are ready for viewing by the user is sent by the system 102 to the user at 309 by employing the data communication network 303, as indicated at 310. The user, receiving a link to view their rating and the abstract report which is complementary, at 311, is able to retrieve from the system 102 at 312 the score and category ratings at 313.

Figure 6:
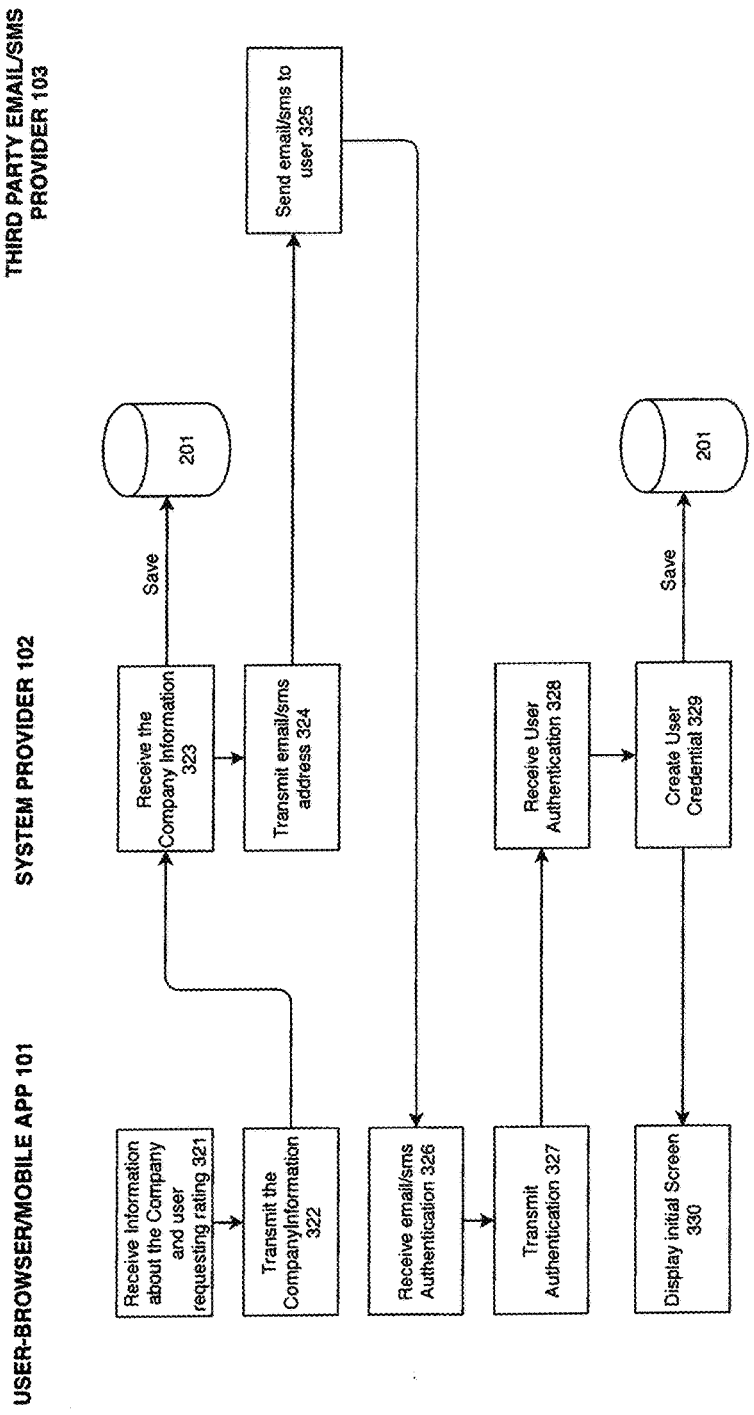
FIG. 6 is a flowchart of steps carried out by various entities for registering a user in a system configured to execute the method of the present invention, under one of the professional and enterprise tiers.

Referring now to FIG. 6, a paying user is eligible to form a profile which is storable on the system 102 for subsequent quick retrieval of the user's information and previous rating results. This is a relatively conventional process outlined by steps 321 through 330 in which the user provides to the system 102 the user identifying information, which generally is static or in other words does not change from one rating-derivation request to the next. The system 102 saves relevant information at step 323 and at step 329 as indicated at 201.

Figure 7:
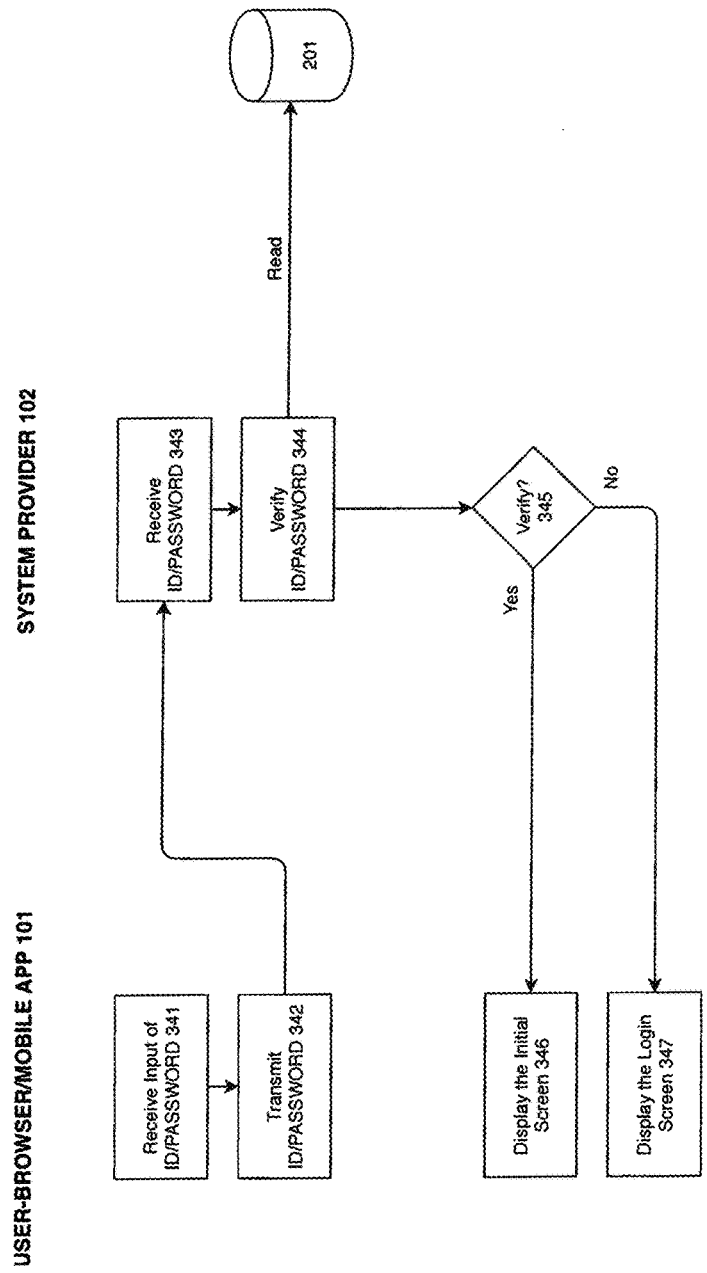
FIG. 7 is a flowchart of steps carried out by various entities for user-login into the system under one of the professional and enterprise tiers.

Referring now to FIG. 7, a registered user is able to access the system 102 by inputting the credentials formed by the system 102 at the time of registration, as illustrated in FIG. 6. The credentials include a user identification and accompanying password which are input by the user to the system, which is represented by steps 341 through 344. If the system determines at 345 that the provided login credentials are correct, meaning that they correspond to credentials stored on the system at 201, then the user can proceed to request another rating at 346; however, if the login credentials do not match any existing credentials, the user is requested to provide another login attempt at 347.

Figure 8:
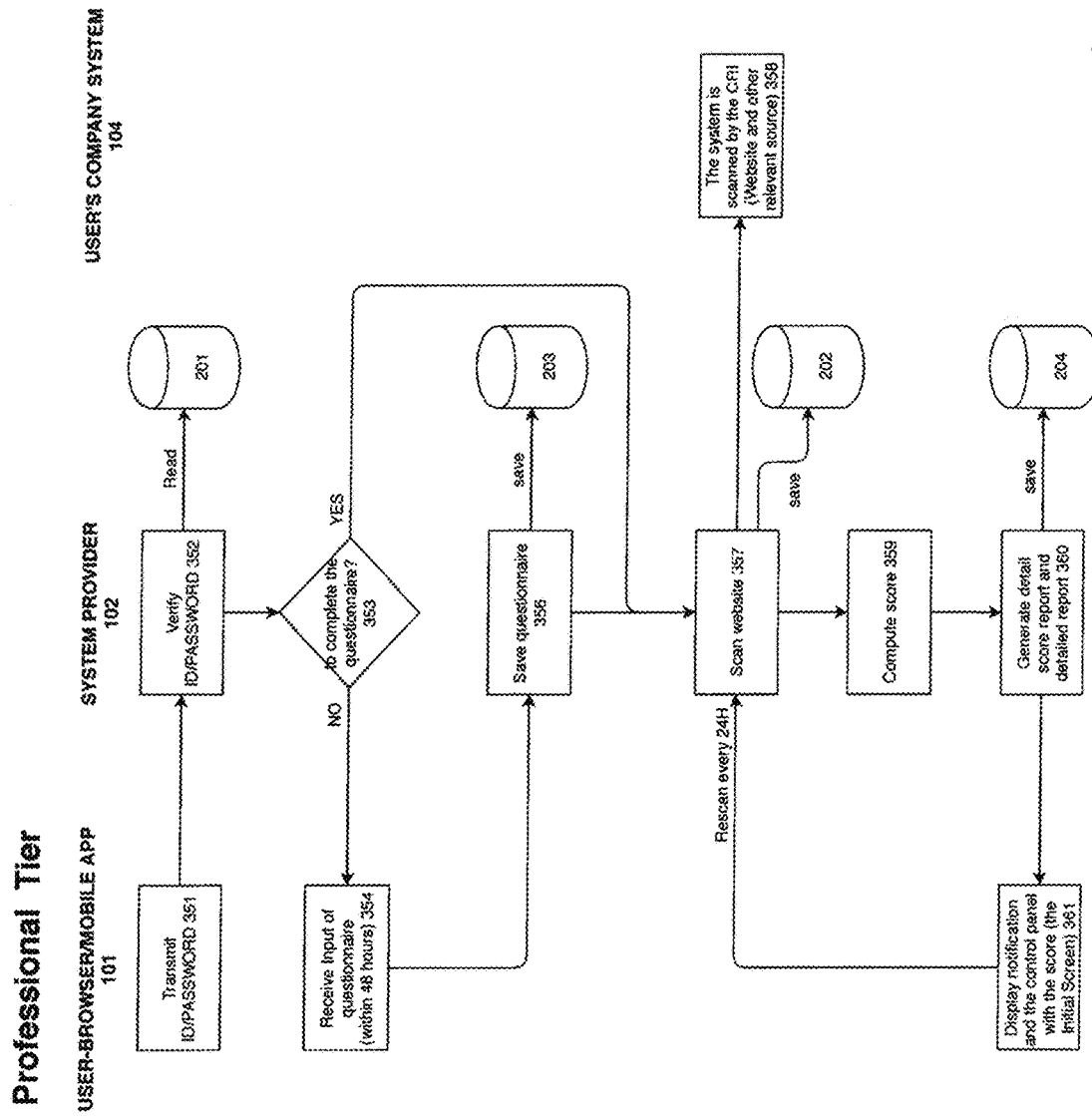
FIG. 8 is a flowchart of steps carried out by various entities involved in the second variant of the method represented by FIGS. 3A-3C.
Figure 9:
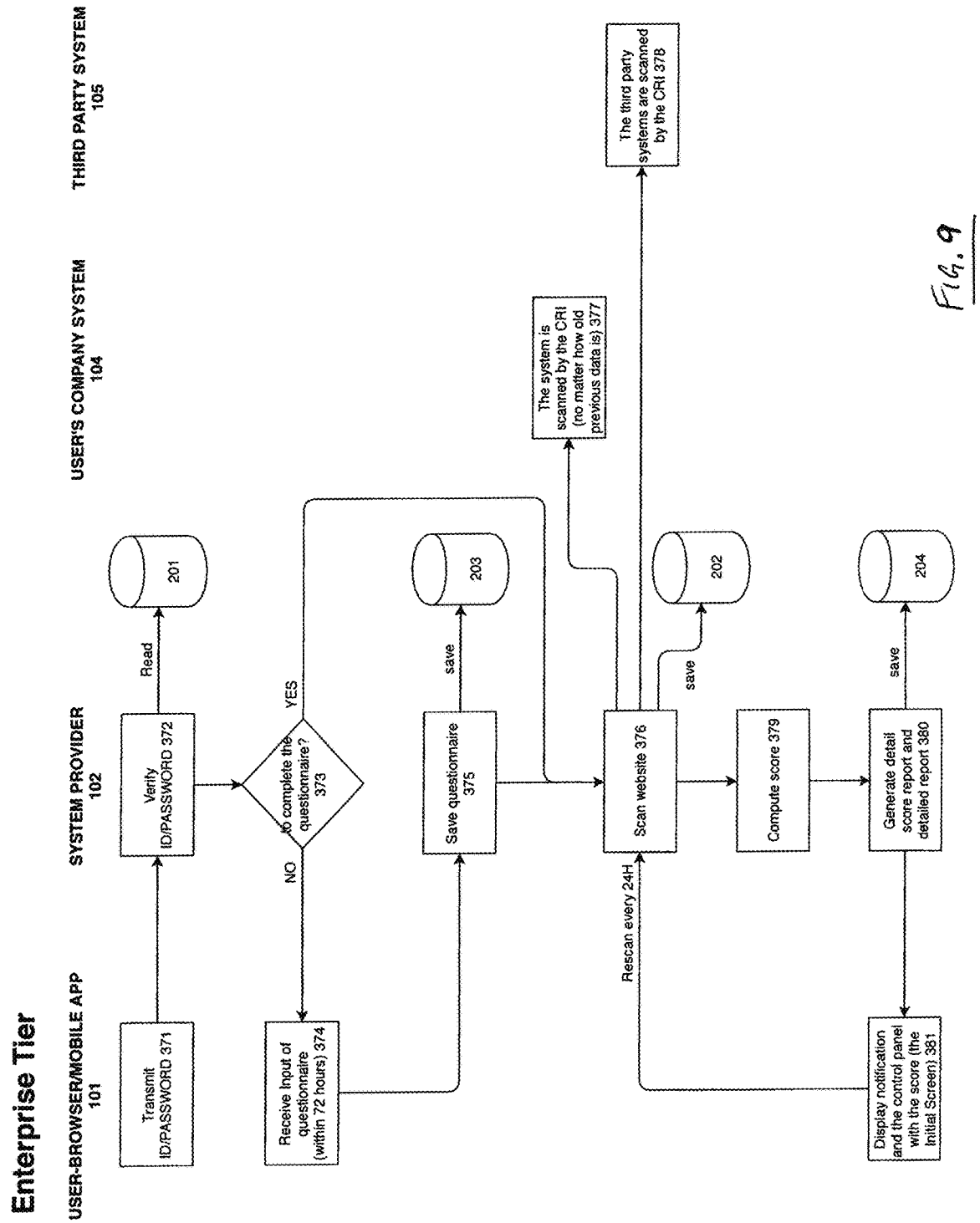
FIG. 9 is a flowchart of steps carried out by various entities involved in the third variant of the method represented by FIGS. 4A-4D.

Referring now to FIGS. 8 and 9, the process of obtaining a cybersecurity rating and report for a professional or enterprise tier user generally commences by the user inputting login credentials to the system 102 at 351-352 or 371-372, which is illustrated in a simplified manner from the more detailed process illustrated in FIG. 7.

Subsequently to successfully logging in, the system 102 determines at 353, 373 whether the user has previous provided input to a questionnaire, or in other words whether there is existing questionnaire data stored on the system 102. If there is no existing user input to a questionnaire or if the previous input thereto is no longer valid, then this information is obtained from the user at 354-356 or 374-375. If there is existing user input to the questionnaire and it is valid at the time of the user accessing the system 102, then the system does not request subsequent input to the questionnaire from the user.

Next, the system 102 scans public domain data as represented at 357, 376 and saves the same at 202. The system 102 also scans the user's digital assets at 358, 377. For an enterprise user, the system 102 also scans an associate's digital assets 378.

Once the scanned data is obtained by the system 102 as described in the previous paragraph, the numerical rating is computed at 359, 379, and reports are generated at 360, 380 and stored for later retrieval at 204. The user is provided with the numerical rating and reports at 361, 381. The system 102 automatically rescans public domain data and the user's digital assets and, in the case of an enterprise tier user, the associate's digital assets after a predetermined period of time elapses following the most recent scan, which in the case of the illustrated arrangements is 24 hours.

The system described hereinbefore is referred to hereinafter, for convenience of reference, as Cyber Rating Index (CRI).

The risk assessment system offered by CRI places a definitive and understandable value—between 300 and 850—on the security posture of an organization. This system probes an organization to gather technical and non-technical information to compute a risk rating. The risk rating provided places an objective value on an organization's cyber infrastructure and policy. The rating provided by CRI helps to further understand the cyber health of an organization (similar to Equifax providing a credit score).

For further clarity, certain terms used herein are defined as follows:
  'Technical data' comprises technical information gathered through examining network assets of an organization (e.g., system firmware, DNS settings, SSL certificates, etc.);
  'Non-technical data' is the intelligence gathered across the web, which is non-technical in nature, such that it is not directly measurable by conventional cybersecurity parameters. This includes, but is not limited to, data from forum posts, articles, hacker chatter, and access for sale;
  'Intelligence' refers to the data obtained, which is used to better understand the security posture of an organization;
  'Cyber Risk Rating' or 'Rating' refers to the computed score of the organization based on both technical and non-technical data. The rating given to an organization is between 300 and 850;
  'System' describes the CRI platform as a whole unless otherwise specified. When referring to a particular specialized system, the reference will precede "system" (e.g., Intelligence system refers to a particular specialized system);
  'Control centre' refers to the user interface after the user has logged in; and
  'API' refers to the application programming interface designed by CRI for an organization to implement, which allows CRI to gather information for the system to subsequently create detailed reports.

The cyber risk ratings provided by CRI will be used by organizations, small and large, to effectively understand their cyber risk. A cyber risk rating allows an organization to further understand where their vulnerabilities may lie by assessing, not only themselves, but their partners and potential affiliates. CRI will monitor a company's on-going security posture, assessing the diligence in improving and securing systems and policy. An organization will be able to use this rating in further evaluating and prospecting existing (and potential) partner(s). The rating provides individuals and organizations objective information to recognize severe risks associated with a given entity. With the information CRI provides, individuals and corporations can effectively make informed decisions to maintain their returns and mitigate potential losses.

CRI is starting from a completely new slate, allowing for flexibility of implementations as well as a specific system design to meet our needs. The overall system design is preferably forward-looking with room for scalability and upgradeability. Privacy and security are the most important aspects the system exercises. The system is data-based and data-driven paying special attention to the accuracy of the data. The data will be used in an elegant front-end user interface where it is represented in both visual and textual forms.

The data obtained by the system will be used across the product range and future products and services offered by CRI. The system preferably uses internet probing tools as well as an API (used by organizations) to gather relevant information.

Intelligence amassed will subsequently be correlated with information on various public databases (e.g., CVE database, NIST database, etc.) to infer the imperativeness of vulnerabilities within an organization.

The data will be used to rate and predict issues related to an organization and any significant changes will automatically inform subscribers of CRI of the respective issues.

The rating system will be using the same data to calculate a security score for organizations, regardless of subscription. The data made available differs for each tier. This allows for consistent scoring and comparison.

CRI systems set an example to all vendors in terms of security. The system meets (and preferably exceeds) best practices outlined by various legislations and security institutions. In terms of efficiency, CRI systems are as efficient as possible without sacrificing security or dependability. The database platform of choice is MongoDB for its scalability.

CRI is expected to have three classes of users. The first class are the non-technical users. The second class of users will be the professionals. The final class of users are enterprise users.

For non-technical users, the priority is information-gathering and presentation. These users will be the investors subscribing to the platform and inquirers of the free tier. It is essential to deliver the information in a manner that promotes understanding of security posture and answers a series of questions assisting the user to better understand the meaning of the score.

For professional users, priority will be to deliver detailed technical reports. Built on the fundamentals provided for the previous user class, professional class offers a more technical approach. Primarily, CRI provides professional subscribers the tools and information they need to better understand and secure their systems.

For enterprise users, all previous classes are built upon and further expanded to provide the most accurate information. Information accuracy and relevancy is of the most importance. Focus will be to deliver information as soon as possible while providing more control for CRI's enterprise subscribers. Tools are comprehensive and customizable for security teams to adapt and implement into their systems.

The primary focus of CRI is information-gathering. CRI focuses on providing the best experience for both non-technical and professional users.

After a subscriber completes the initial process of account creation, an interactive tutorial displaying the functions of the control panel and abilities highlight the uses of the control panel.

API provided to subscribing organizations requires thorough documentation. API documentation preferably highlights the implementation techniques, information collected by the API, common errors, troubleshooting, and more.

The systems providing all of the functionality used by CRI's products and services are highly specialized in nature. They each perform a particular task to assist with meeting the output requirements. The specialized systems referenced are an overview of potential systems CRI preferably considers implementing. Specialized systems that are required, but omitted from this document, will be further explored prior to the development phase and the document will be amended accordingly.

The intelligence system is the backbone of CRI's products and services. The intelligence system's primary objective is to gather intelligent data to facilitate a better understanding of an organization's security posture. The data accumulated will be used by other systems to perform various functions (e.g., prediction system uses the data to predict susceptibility of an attack). The integrity and security of this system is the highest priority.

Given a business, the intelligence system performs probing functions to gather intelligent data (both technical and non-technical) of a business. The data points are TBD. The data garnered is from public sources. This system also includes data actively received from premium subscribers who have implemented CRI's API in their infrastructure.

The CRI Intelligence system is configured to perform the following tasks:
  Collect data from around the web on a given entity;
  Probe data frequently to update stored values;
  Allow for increased frequency for subscribers of services;
  Collect data from API implemented in subscribing organizations; and
  Keep historical data for reference.

The user account system (UAS) stores, manages, and controls subscriber accounts. The objective of this system is to keep track of the accounts.

The free tier is provided to any organization with an online presence. An inquirer requests their score from a specific webpage on the CRI website. An inquirer then follows a series of steps before CRI gathers and computes their organization's cyber risk rating.

Starting from the dedicated webpage for a free rating assessment, a user will be presented sample ratings and information describing a cyber risk rating. The form to fill out will be at the beginning of the page to funnel a user to enter information and request an assessment for their business.

An inquirer is requested to input mandatory information to request a cyber security rating. The information comprises:
  Full name
  Email
  Business name
  Business address (Unit/apt, Street, City, State, Country)
  Business website
  Phone number (optional)

Upon an inquirer inputting their business address, an autocomplete feature will attempt to autofill the business name based on information CRI has gathered from municipalities publishing a list registered businesses.

Following an inquirer's submission, the CRI system simultaneously executes two tasks. First, the system immediately conducts its operations on gathering both technical and non-technical data on a company. Second, the inquirer is prompted to answer a questionnaire (between 10 and 15 questions).

After submission, CRI's rating system will send an email with a unique link (valid for 48 hours) to view the security rating of the organization. This page will abstractly highlight the reasoning for their score breaking down areas of excellence and detriment. There will be an option for a user to download the PDF version of the rating of what they see on the screen. An option will be made available to purchase a one-time detailed report as well which will provide a score valid for a specified amount of time (valid time TBD).

In the event the questionnaire is not completed, the CRI system continues the process of collecting data of an organization. Following completion, the user receives the notification email of a completed risk rating. The caveat is that, before they are able to view the rating, they complete the questionnaire. Since the questions have predetermined values, CRI will calculate the rating upon receiving the responses and redirect the user to their unique link. This link may be once again emailed for their records being valid for 48 hours.

Upon computation of the cybersecurity rating for the free tier user, an abstract report is generated, with a user-selectable option to purchase a detailed report associated with that executed assessment.

The professional tier is a premium subscription-based service designed for small- and medium-sized business to better understand their security posture, vulnerabilities, and network assets. This service provides an up-to-date view of the vulnerabilities residing within the network assets of an organization. Continuously monitoring the internet for potential vulnerabilities, an organization has access to issues and potential issues they are facing.

An organization looking to purchase the professional package for monitoring services may be directed to a page where they can start the purchase process.
  Options of purchasing subscription include:
    A purchase inquiry may be requested from the system to initiate the process to purchase the professional monitoring service (allows for better customization to meet an organization's requirements)
    A company simply purchases the monitoring subscription (included features comprise a basic non-customizable set, which may not be suited for users that are larger companies desiring a level of customization to tailor the monitoring to their needs)

Once purchased, a link is sent to the registrant to activate their account to begin the process. First, they are asked information about their company and industry. All fields asked from the free tier are mandatory. Primary contacts and administrators are then set up with accounts for access to the control centre.

After the initial set-up, a company is requested to complete a questionnaire of a significantly larger size. The company is provided with a limited period of time for example 48 hours within which to complete the questionnaire. Their answers are saved and reviewable until the deadline. The questionnaire may be completed in a single session or progress of a partially completed questionnaire may be intermittently saved, and can be later accessed for completion via the control panel. To reduce sub-menu navigation, a notification center on the control panel may prompt the company to review and complete the questionnaire each time logging in within the 48-hour timeline.

When CRI has computed the company's risk rating, a notification appears to alert the administrator(s) to view the findings of CRI.

Professional subscribing members get the benefit of automated and constant monitoring services. CRI will automatically monitor a company's network infrastructure and report important issues. A professional user may adjust notification parameters as well. Notifications can be chosen based on the immediacy of the issue (which CRI computes by correlating vulnerabilities with other data); a company has a choice to receive important, critical, and/or recommended notifications.

The control panel, accessible at all times, is the primary tool professional tier subscribers utilize to obtain a deeper understanding of their security posture. Their network assets are automatically mapped with a visual diagram to visualize the manner in which they are arranged. Lower "health" assets will be color-coordinated accordingly; red indicating that the asset is severely requiring further inspection and attention, and green indicating that the asset is in good standing.

Through the control panel, an option will be available to generate a detailed report outlining the technical and relevant non-technical issues relating to the company.

Thus the system is configured, for the professional tier user, to perform the following:
  Control panel for subscribers to view information of their company;
  Automatic generation of a network asset map (editable);
  Provide health indicators of assets (colour-coordinated);
  More detailed information available on asset health through the control panel;
  Automated generation of a formal detailed report;
  Automatic gathering of data and change reporting;
  Adjustable notification system for better control of notifications; and
  Vulnerability prediction system to provide forward-looking information on expected security posture at a later date The enterprise service offered by CRI is a highly specialized solution designed for large corporations with a wider network asset range. Corporations requiring enterprise services contact CRI. Enterprise services build on the professional tier, increasing the scope of variables processed in real-time. Along with more in-depth intelligence gathering, more technical and non-technical information is gathered and presented to the subscriber. The control centre includes more sections allowing for the corporation's IT team to see finer details of their network. An API is provided as well for information gathering and data correlation purposes. A custom integration solution may be developed for enterprise clients to receive CRI's information in a more appropriate and preferred manner.

The overall objective of the enterprise tier is to increase the frequency and priority of information and resources. This solution is highly adaptable and is more of a collaborative effort between CRI and organizations requiring it.

The nature of the enterprise solution does not allow for a definitive process flow. Rather, the described is a framework which can be expanded and molded to fit the requirements of clients.

An enterprise solution may be specifically designed to meet the requirements of an inquiring company after a process has been initiated. The initiation process is facilitated through a specific sub-domain designed to showcase the advantages of CRI in an enterprise environment. Organizations are requested to fill out information to help CRI further suggest a solution.

Once an organization looking for an enterprise service completes the form, CRI will have a representative to contact and gather further information to design a solution. An in-depth questionnaire is sent to the organization, where it is to be completed within a fixed predetermined period of time longer than that provided for professional tier users, for example 72 hours, as the questionnaire is longer for enterprise users.

Over the next 72 hours, CRI systems collect extensive data on the network assets of an organization where vulnerabilities discovered may be confirmed by a human.

Once the data collection and confirmation process is completed, the enterprise receives from the system a notification to view their vulnerability report. The user logs into a specific version of the control centre. The control centre includes many sections to view the technical and non-technical data collected around the web. These sections are categorized according to the vectors designed (TBD). In a list format, the vulnerabilities are reported in a concise and informative manner for the respective vectors.

Predictions based on information retrieved through the API, historical data, and new emerging threat intelligence data are provided. These indicators provide a synopsis of the changing landscape and its importance for an organization.

All of the data are compiled and provided in an extensive detailed report that could be automatically generated. The detailed report template is specific to enterprises and are designed to place importance on critical vulnerabilities and assets in danger of being compromised (both human and systems).

An executive reporting option will also be included where the technical information and current security state of a company will be presented in a manner the C-suite understands. This option is a request as it will not be automatically generated. Once the request is sent, the user will receive an email notification and confirmation. The confirmation will outline the timeline in which the report will be completed. The completed executive report will be available through the control centre. As well, previous reports and report requests are archived and available for access. Each report will be secure and digitally signed to ensure integrity.

Thus the system is configured, for the enterprise tier user, to perform the following:
  Enterprise solutions, although custom, will offer comprehensive information as a standard. Enterprise builds on the professional tier and includes the dark web in the list of sources to gather real-time information through. The dark web will be constantly leveraged to provide a more in-depth look at organizational vulnerabilities as a whole
  Also included is an important persons vulnerability section. Each high-ranking member could be targeted by criminals and CRI gathers information that may make a company vulnerable to such social engineering attacks
  Enterprise solutions will also provide active monitoring services for a company's supply chain. They input partner information and the network assets are mapped to view for significant vulnerabilities
  Using the information from the company, CRI will attempt to automatically map network assets and allow the IT team to modify the map to further divide assets to please their needs Business objectives of the organization will be used as well to help align presentation of intelligent data CRI accumulates for an organization.

Automated generation of an extended detailed report with all vulnerabilities listed Request and archive of executive reporting; all reports are available through the control centre and archived for access at later times Predictions engine including supply chain, emerging threats, and historical data Real-time dark web monitoring for technical and non-technical information API to integrate behind the firewall for better information gathering and intelligence Real-time focus on all vulnerable points with the inclusion of Internet-of-Things devices Compliance assessment In summary, the standard or free tier offers specific information about your current threat profile and exposure. Our award winning custom Intelligence gathering techniques, elicit basic information about your company and intelligently analyze the information to provide an assessment of your current security posture. Depending on our analysis, the report may provide an opportunity for your security team to understand your enterprise vulnerabilities and current level of threats. However, the Standard Tier rating is limited to your organization's consumption and may not be used for other external purposes, such as cyber liability insurance, legal defence or other external requirements.

In summary, in regard to the professional tier which is suited for small and medium organizations, this is a comprehensive package that transcends standard intelligence gathering, but inclusive of other areas which may offer a deeper insight into your existing risks exposure. Here, we combine our in-house custom interrogator with best-in-suite analytics to generate a comprehensive report and scoring for internal and external purposes. The professionally written report may be shared with your insurance, regulatory bodies and audit.

In summary, the enterprise tier offers everything in Professional tier plus the compliance reports with prominent regulations and standards like, International Standard Organization ISO27001/02, General Data Protection Regulations (GDPR), Personal Information Protection and Electronic Documents Act, California Consumer Privacy Act, Health Insurance Portability and Accountability Act, Personal Health Information Protection Act, Australian Data Privacy Regulation and more as they evolve.

The features of CRI include:

Third Party Risk Rating

Third party risk rating feature is preferably provided to enterprise customers only. This feature scans all suppliers and other vendors associated with an enterprise, providing a rating for said vendors. It then include the score on the enterprises network map, providing a more comprehensive, detailed picture of where an enterprises network weakness lay. As well as the network map, a report is sent to enterprises of any vendors with above average, or any vendor at above expected risk levels. Enterprises are expected to provide names of all vendors/suppliers they wish to be analyzed.

CRI's third-party risk rating solution provides enterprises a detailed view into the cyber risk associated with their partners, vendors, suppliers, and/or other affiliate organizations. The information retrieved is presented into an entity network map, granting better understanding of overall network structure. A detailed report is generated for each third party and is accessible by the subscriber.

Process associated with this feature comprises the following steps:
1. Enter information of affiliate enterprise(s)
2. CRI begins probing
3. Questionnaire sent to affiliate enterprise
4. Network entity map generated
5. Rating provided to subscriber through subscriber panel
6. Detailed report generated for each enterprise Extended Security Assessment This service is similar to the Third-party risk rating, except that it includes in its scope, on top of the third-party vendors, fourth party vendors. These are vendors that service the vendors that the enterprise employs. These are not included in the enterprises direct network map, but any outliers with above expected risk are identified up in a report, detailing which vendor they service and what kind of issue is present, and presented to the CISO of an enterprise.

The extended security assessment offered by CRI is a comprehensive look into vulnerabilities not traditionally considered. The extended security assessment is unparalleled in assessing risks by considering indirect affiliates of an enterprise. The service provides the subscribing organization with an entity network map outlining the direct and indirect affiliate enterprises. As well, a detailed report is generated for the subscribing enterprise supplying information to improve and better secure networks.

Process associated with this feature comprises the following steps:
1. Enter direct affiliate enterprise(s)
2. Email sent to inform IT Chief of affiliate enterprise(s) to supply their affiliate enterprise(s)
3. CRI probes direct and indirect enterprise(s)
4. Network entity map generated
5. Ratings of each enterprise provided to subscriber; and aggregate rating provided (all enterprise ratings for an overall risk assessment of affiliates)
6. Detailed report generated for each individual enterprise C-Suite Reporting This is a reporting service for executive officers and board members of a company; it highlights major areas of risk which are of pressing concern to the enterprise. It also includes a general overview of the enterprises network system, how it stands up against the industry standard. It's intent is to inform executive officers of the enterprise what shape the enterprise network is in; similarly to how doctors inform patients of a health report after check ups.

C-Suite reporting, generated by CRI, is an executive-level description of the cyber security posture of an enterprise. By providing relevant metrics, executives can better understand their security posture. The report provides a high-level overview without loss of detail. The C-suite report provides meaning and context suited for enterprises to understand the business implications of the cyber risk rating.

Process associated with this feature comprises the following steps:
1. Subscriber requests C-suite report
2. Report generated with human review (up to 5 business days)
3. Report published on subscriber panel with digital certificate and signature The C-Suite report may indicate one or more of the following:
- Business information, industry, etc.
- Cybersecurity score with information on what the score means
- Industry average score
- Month-to-month history
- Last 6 month history on patching systems
- Predictive risk score and prediction on outlook over next 12 months
- Industry average risk and widespread vulnerabilities
- Risk factors and/or areas of vulnerabilities
- Attractiveness of business industry for attack and business being a target
- Outlook of industry trends for sector specific attacks
- Section explaining how score is calculated
- Company specific information such as:
  - Average patch time versus industry average patch time
  - Vulnerable endpoints
  - Endpoints relative to size
  - Potentially severe infiltration points Enterprise Threat and Vulnerability and Analysis This audit service aims to use the data gained from initial probing of enterprise networks to locate weaknesses in an enterprises personal network. This difference between this and the score rating itself Is that this service goes into more detail as to where weaknesses lay, providing the enterprise with a detailed report of what systems are causing vulnerabilities and suggested steps forward for the company.

Enterprise threat and vulnerability analysis focuses on the individual systems within an enterprise. The intelligence is gathered on the enterprise's internal network and a detailed report of the internal network infrastructure is produced. The enterprise threat and vulnerability analysis provides information essential to maintain the security of the internal network.

Process associated with this feature comprises the following steps:
1. Subscriber provides required information
2. CRI probes domain
3. Report generated and published on the subscriber panel Threat Intelligence Gathering and Reporting The threat intelligence gathering system looks for any indicators or mechanisms providing evidence-based knowledge to us, for example the technical and non-technical data described herein. This enables the system to provide advice to clients about potential hazards to their systems in advance and provide advice on how to mitigate such hazard or prevent them entirely. This provides valuable in mitigating attacks before they happen, rather than responding to them after they've happened (Incident response).

CRI's threat intelligence gathering and reporting system is a forward approach to an ever-changing threat landscape, providing the latest information and intelligence on current threats. The reports assist an enterprise in understanding and implementing necessary adjustments to maintain a secure infrastructure.

This threat intelligence gathering is provided by a Web scanner predominantly used to gather information from all sources on the web, then aggregate the data in a report format to indicate the presence of vulnerabilities and high risk practices. This report combined with the algorithmic "cyber-metric" (Intelligence Questionnaire) questions is further analyzed to generate a cybersecurity rating score.

Process associated with this feature comprises the following steps:
1. Reports provided to an enterprise outlining the threat landscape
2. Subscribers access the report through the subscriber panel
Can run an assessment for specific threats and vulnerability index

Post Cyber-Attack Business Impact Analysis

Post Cyber-attack business impact is a service which audits enterprises to provide them information about how their businesses may be impacted in a number of ways including economically after a cyber incident. This could include incidents such as data breaches, ransomware attacks, denial of service attacks and XSS attacks to name a few. This service ultimately provides a report to the customer that outlines what systems are the most critical systems to a company and attempt to estimate losses based on worst case scenarios.

CRI's post cyber-attack impact analysis aims to assess the recoverability of an enterprise. The analysis extends the technical impacts on business day-to-day operations and provides straightforward metrics (including economic). The results are packaged into an elegant report providing both visual aids and descriptions.

Process associated with this feature comprises the following steps:
1. Company requests an impact assessment
2. CRI gathers required information (technical, nontechnical, business process, etc.)
3. CRI begins analysis
4. CRI generates a human report
5. Provides report through subscriber portal Regulatory Compliance Assessment and Reporting This service assesses enterprises via questionnaire and data probing of their compliance to certain legislations and frameworks, for example the GDPR or PIPEDA which are there to protect the data of private citizens during data processing and transfer. This service ultimately provide customers with a certificate of approval by the CRI for certain legislations or frameworks. For example, a company audited by us for GDPR compliance, which has passed the necessary tests, is subsequently given a certificate of GDPR compliance by CRI.

For any enterprise, compliance with regulations can become fairly difficult. CRI offers a regulatory compliance assessment and reporting solution to assist in meeting and exceeding compliance. The service assesses the current level of compliance to recognized frameworks and specific world (or regional) regulation. A report of compliance provides areas that an enterprise displays exceptional leadership in, and areas where adjustments may allow for the user to consequently be compliant (for each regulation/framework).

Process associated with this feature comprises the following steps:
1. Enterprise requests compliance assessment
2. CRI gathers intelligence (online and offline)
3. CRI analyses data retrieved
4. Report generated
5. Report provided through subscriber panel

Business Expansion Vulnerability Scanning and Assessment

When a business acquires another business through mergers or acquisitions, they also acquire the vulnerabilities that come with the network systems. This process is similar to third-party risk assessment but focuses on the acquired networks, providing an audit on their security status.

Business expansion vulnerability assessment delivers enterprises undergoing mergers and/or acquisitions intelligence on the infrastructure and posture of cyber risk for an enterprise being explored. CRI's solution generates a detailed report providing information on vulnerabilities (internal & external) which may be inherited.

Process associated with this feature comprises the following steps:
1. Enterprise information provided
2. Questionnaire sent to chief for response
3. Report generated and available on subscriber panel

Investors Report

As seen in the news, cyber-incidents lead to serious consequences for companies. This includes a dip in stock prices which affects investors. As a result, Investors preferably do due diligence on an enterprise's security standings before investing in them. This aims to help them achieve this by providing a report similar to the C-suite report that outlines key weaknesses or strengths of an enterprise network's security standing. The aim of this report is to help put investors at ease and allow them to invest with confidence in an enterprise or to highlight for them the issues with a network and why they should not be investing their money into an organization.

CRI's investor reporting system is a new take on investment data gathering. The primary audience for investor's report is persons (or entities) looking to better understand the cyber security posture of an enterprise being considered for investment purposes. Similar to a C-suite report, an investor's report provides necessary data of an enterprise's posture on cyber security. It also provides crucial information of impacts on operations based on various data points.

Process associated with this feature comprises the following steps:
1. Investor uses index search to search company (can be symbol on exchanges)
2. They can view all metrics and CRI metrics in one area
3. Download and save report (various formats e.g., csv, pdf, etc.)

Figure 10:
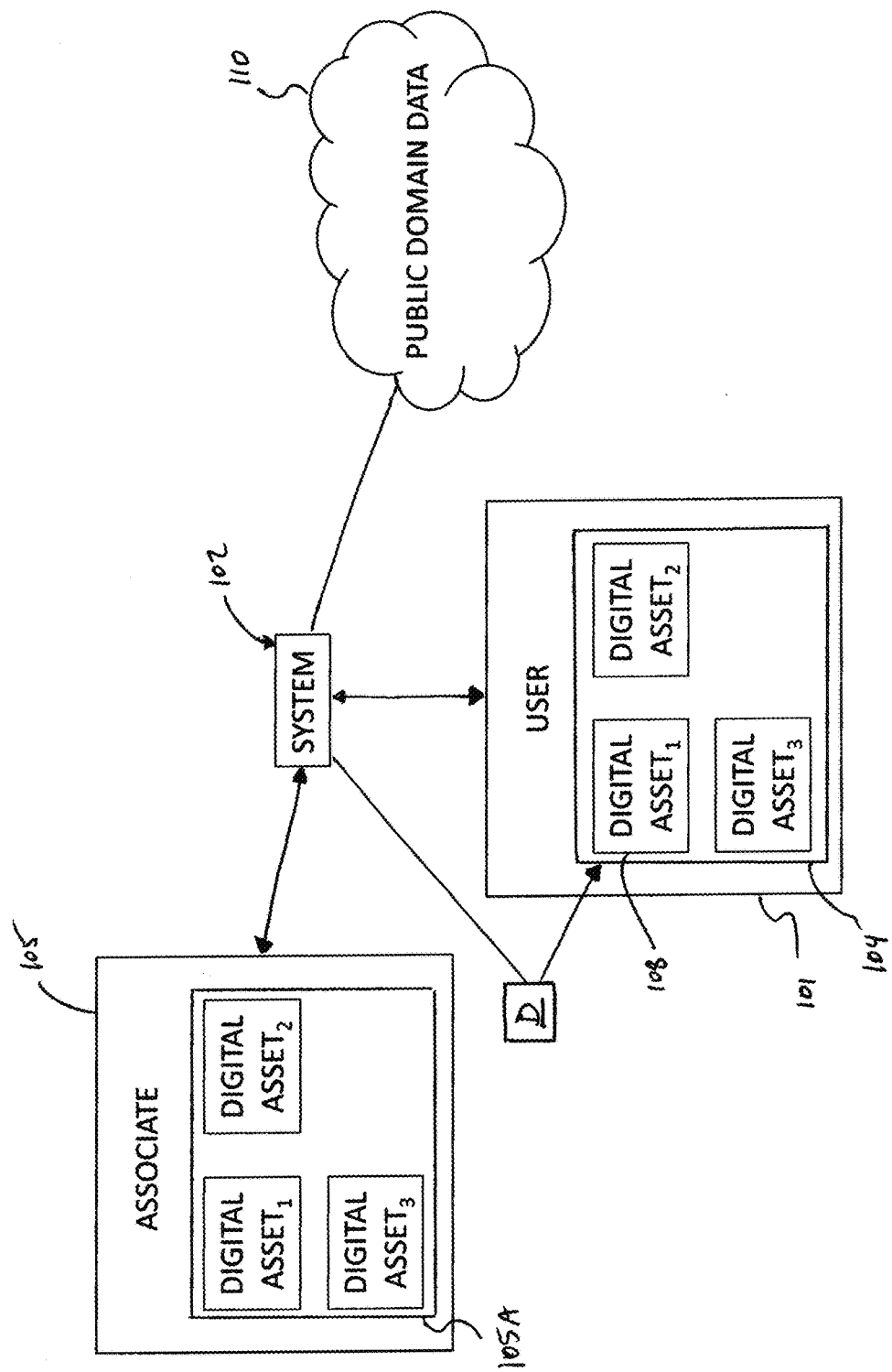
FIG. 10 is a schematic diagram of various actors which are relevant to a system according to the present invention.

Referring to FIG. 10, the system 102 is communicated with the user's network 104, which comprises a plurality of intercommunicated digital assets 108, over existing data communication channels. The user's digital assets 108, such as those labelled $DIGITAL\ ASSET_1$ through $DIGITAL\ ASSET_3$, comprise electronic computing and data storage devices, typically with communication functionality so as to be configured to transmit and receive data from other communicable computing devices, which are communicatively coupled on the user's network 104 so that data can be transmitted between the devices 108 and other external third-party networks over the Internet. In this manner the user's digital assets are exposed for cyberattack from third-party networks over the Internet. The system 102 has access over the Internet to public domain data or publicly accessible data sources 110.

When the user subscribes to the enterprise tier, the system 102 is also communicated with an associate organization 105 with which the user 101 conducts business. The associate 105 also has a network of digital assets 105A such as $DIGITAL\ ASSET_1$ through $DIGITAL\ ASSET_3$.

Figure 11:
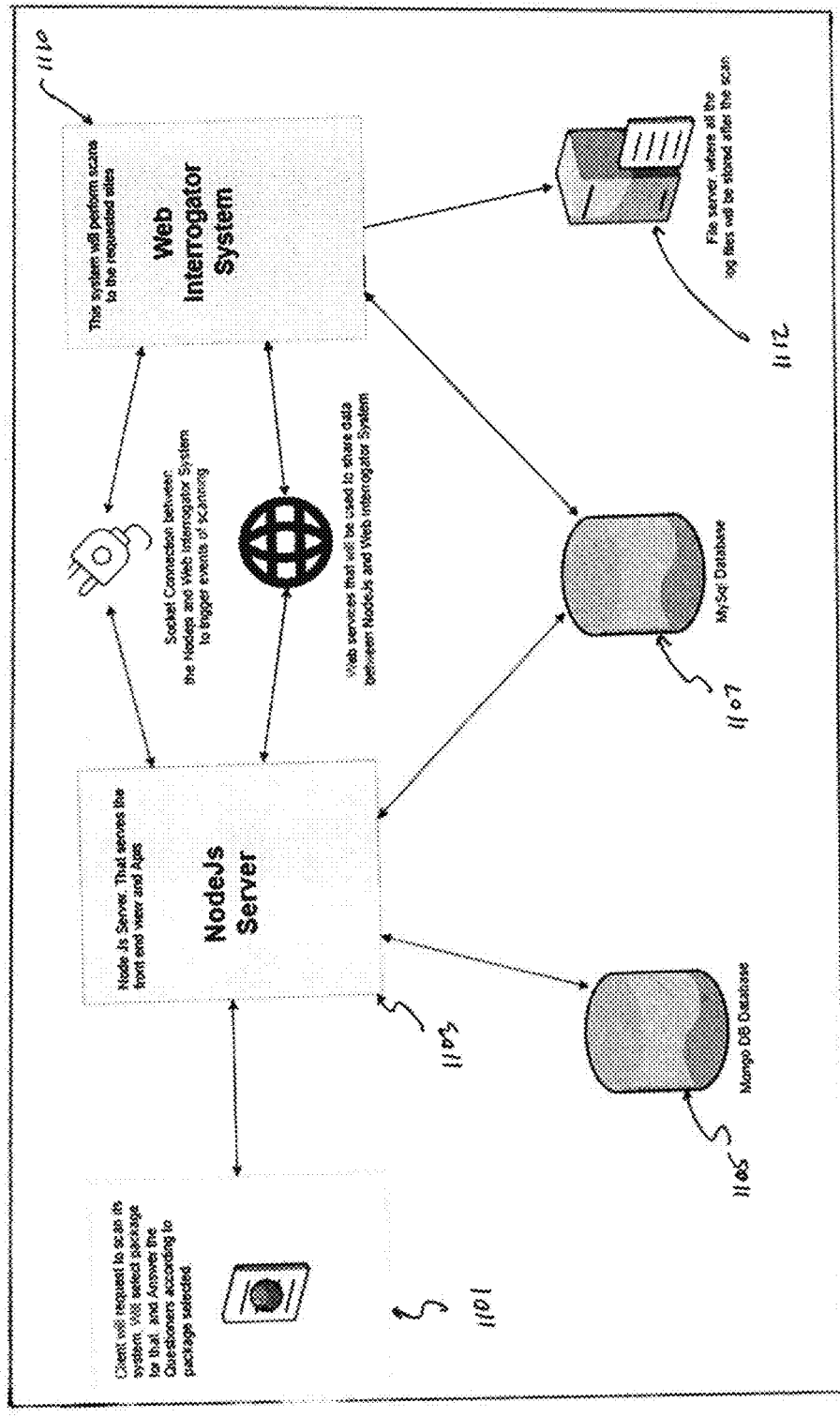
FIG. 11 is a schematic diagram of a system configured to execute the method of the present invention.

As shown more clearly in FIG. 11, the system 102 comprises a client interface 1101 in the form of a website (front end of the system), a server referred to as 'Node Js' and indicated at 1103 which services the website and APIs, a first database referred to as 'MongoDB' 1105, a second database referred to as 'MySql' 1107, a data gathering tool referred to as 'Web Interrogator' or 'Artemis' which is indicated at 1110, and a server configured to store files obtained during the data collection step that is indicated at 1112. The servers are conventional servers each comprising a memory having instructions stored thereon and a processor operatively coupled to the memory so as to be configured to execute instructions stored thereon.

In regard to the client front end 1101:
User 101 interacts with the system 102 via the website 1001. User 101 will do the registration and request for the system scan.

For Requesting a system scan, User 101 provides the details regarding the client website and Industry it belongs, that is their own website and own industry to which they belong.

User 101 selects the package for the services from CRI System.

User 101 will prompt responsive questions based on the package and industry type selected.

Once user will submit his response, he waits for reports until the complete system scan is done.

Questionnaire 1200 connotes the input or data which the user provides in forms of answers or responses. This questionnaire is scripted using certain algorithmic method. The questions are tailored to individual packages which may include, standard tier, small & medium size businesses (a.k.a professional tier) and enterprise tier. The responses to the questionnaire, and the intelligence gathering of the users' publicly available information and intelligence gathering determines the rating of the client's risk exposure.

In regard to the Node Js 1103, this server is used to service front end to the end user. It handles all the request and response to the frontend. This server will also be responsible for the storing the and managing CRi system Data. This Server will also be communicating with the web interrogator system in backend using Sockets and APIS as needed. Once user submits the request for it's system scan, Node Server will initiate the request for scanning to the web interrogator system. This is the distributing and communicating server that disseminates and receives information from the CRI system to the connected systems—Artemis Web Interrogator, Database, User Interface (UI), and file and archive servers. The Node JS is powered by the socket connection to trigger events of scanning.

In regard to Web Interrogator System 1110, this is responsible to doing the clients system scan and generate the report log files. This system will receive the request for the system scan from Node Server. Artemis Web Interrogator is a customized system that uses set of algorithm and programming methods to perform scanning and gathering of information/data from multiple sources to determine the vulnerabilities of the user's system, or connected systems, including the third party, and interfaces. Artemis framework groups the scanning report into various categories some of which may include, Reconnaissance, Enumeration, Vulnerability Assessment, Penetration Testing, and Risk Assessment. The system checks the host of information including the malware detection, the strength of authentication, Secure Socket layer (SSL), Heartbleed, phishing attacks, social engineering, network real-time monitoring. The system also includes hardware device which a user could install on their network to provide a real-time analysis of the vulnerabilities and threats in the client's network.

The MongoDB Server 1105 is a database used to store and manages all of the Questionnaires, Packages, Users information, and all other detail required to manage the reports. Only Node Js server will have access to this Database. This is the system that stores user's information including the rating, registration and enterprise identifiable information (EII) as well as, the questionnaire. The system interacts with the Web Interrogator by passing on user's information, questionnaire and user's responses to those questionnaires to the Web Interrogator.

The MySQL Server 1107 is a database used to store the file paths of the logs files that has been generated and stored in file a Server by Web Interrogator System. This database will be accessed by both Node Js and Web Interrogator System. The Web Interrogator uses the SQL database to store scanned information from where it passes data to the CRI database. Receives a generated ticket number corresponding to an initiated scan. Information creating an entity profile such as Name, Address, Website, etc. are stored within this structured database.

The File Server 1112 is used to store all the log files that has been generated by the Web Interrogator System. This server will be accessed by both Node Js and Web Interrogator System. Node Js server will use this server to get the logs files of the scans. This server log files and scanned information are stored in file server.

Communication mediums for the foregoing components of the system are as follows:

In regard to the Node and Web Interrogator Systems, these servers are configured to operatively communicate through sockets and REST APIs.

Node and MongoDB servers are directly interconnected for communication;

Node and MySql servers are directly interconnected for communication

Node and File Servers are directly interconnected for communication

Web Interrogator System and MySql servers are directly interconnected for communication Web Interrogator System and File Server are directly interconnected for communication Information flows through the system as follows:

When the node JS server gets request for a system scan, server will save all the request details into the mongo database An event will be emitted on the sockets, which web integrator system will be listening to.

The web integrated system receive a request ID of the request, and will make RESTful API call to the node JS with request ID to get the request data including the website to scan, the industry type and all the question with the responses of user.

Web Interrogator System will start scanning according to the selected package for that request and based on the question user answered.

Once system completes the scan and generate the log files, the log files will be stored in the file server and the path of the logs files will be stored in MySql server with the requested.

Once the system scan is completed, the Web Interrogator System will emit an event on socket with the request id, acknowledging the node server that the system scanning is completed.

The Node server will fetch the log file path from the MySql Server, and save the data into MongoDb along with new generated report and the cyber rating index of the scanned system.

It will be good if Web Interrogator System, will store all the data (Report logs files and Cyber Rating Index) in JSON strgin format inside the file.

Artemis Web Integrator 1110 is a custom tool developed to scan client network, web domain, DNS, logs, public sites, social media, dark web and other connected systems, links and internet affiliations. The tool run gather intelligence based on publicly available information, set of questionnaire and probing of other informational sources then provide information that is further used to determine the rating. The rating is determined by using set of mathematical algorithms and programming to determine the risk rating of the user.

The risk rating is essentially determined through intelligence gathering of users' enterprise or corporate network, and other online activities' determination. In addition, a set of custom questions are developed and tailored towards enterprise's security architecture, IT landscape and other third party security assessment. The questions are group by the category of the product the use is subscribed. These categories range from Standard, Small and Medium Organizations (a.k.a. Professional Tier) and Enterprise Tier (big corporations).

There are two databases involved: one houses the registration details and questionnaire while the other database houses the engine (Web Interrogator, Artemis) to analyze the information provided by the registration-and-questionnaire-based database, then display the risk assessment score and report on the registration-and-questionnaire-based database in a handshake system.

The web interrogator and vulnerability assessment framework ties multiple tools into a single framework. This is the version 1. Version 2 expands on the capabilities as there's much more that can be accomplished with this unique and highly capable tool. There is also a piece of hardware/device which users can mount on their network to obtain a real-time analysis of the client's network, traffic analysis and logs. With this tool we are able to monitor any cyberattacks on the client's network.

The Artemis framework is organized to perform assessments in the following phases: (1) Reconnaissance (2) Enumeration (3) Vulnerability Assessment (4) Penetration Testing (5) Risk Assessment and Presentation.

The following is a brief description of the information which is procured within each phase:

In the Reconnaissance phase, the system determines: host system information; geo information; SSL certification and vulnerability assessment (weak or compromised keys); nmap and OS detection for vulnerability assessment; nslookup; exposed email addresses; check if the domain(s) have been seen on malicious blacklists or seen distributing malware/

In the Enumeration phase, the system is configured to provide: website security vulnerability header analysis; php vulnerability assessment; vhost scanning; exposed files from the domains; directory listing and enumeration; wayback machine scanning for exposed files/information; subdomain enumeration (for unintentional directory exposure e.g. admin, email folders, etc.); Wordpress scanning.

In the Vulnerability Assessment phase, the system is configured to perform multiple checks to audit security state of the user, for example at the enterprise tier, including: OpenSSL heartbleed; malware distribution and malware infection check; ssl mitm analysis and verification; SSL weak or compromised key assessment; multiple vulnerability assessments, similar to Nessus to provide discovered vulnerabilities (if any) along with respective CVE, such as advanced scanning from nmap scripts, commix, wpscan, commix, photon, nikto, etc (we will automate all of these scans and provide responses via uniform interface); XSS scanning and vulnerability assessment; PHP weakness testing.

In the Penetration Testing phase, the system is configured to test potential vulnerabilities by performing bruteforce logins and exploitation analysis.

In the Risk Assessment and Presentation phase, the system is configured to consolidate information from the scans to determine if the domain(s) is susceptible to various attacks from your common attackers, in other words the most common cyberattacks. This is the consolidation of the report to present back to the user.

Figure 12:
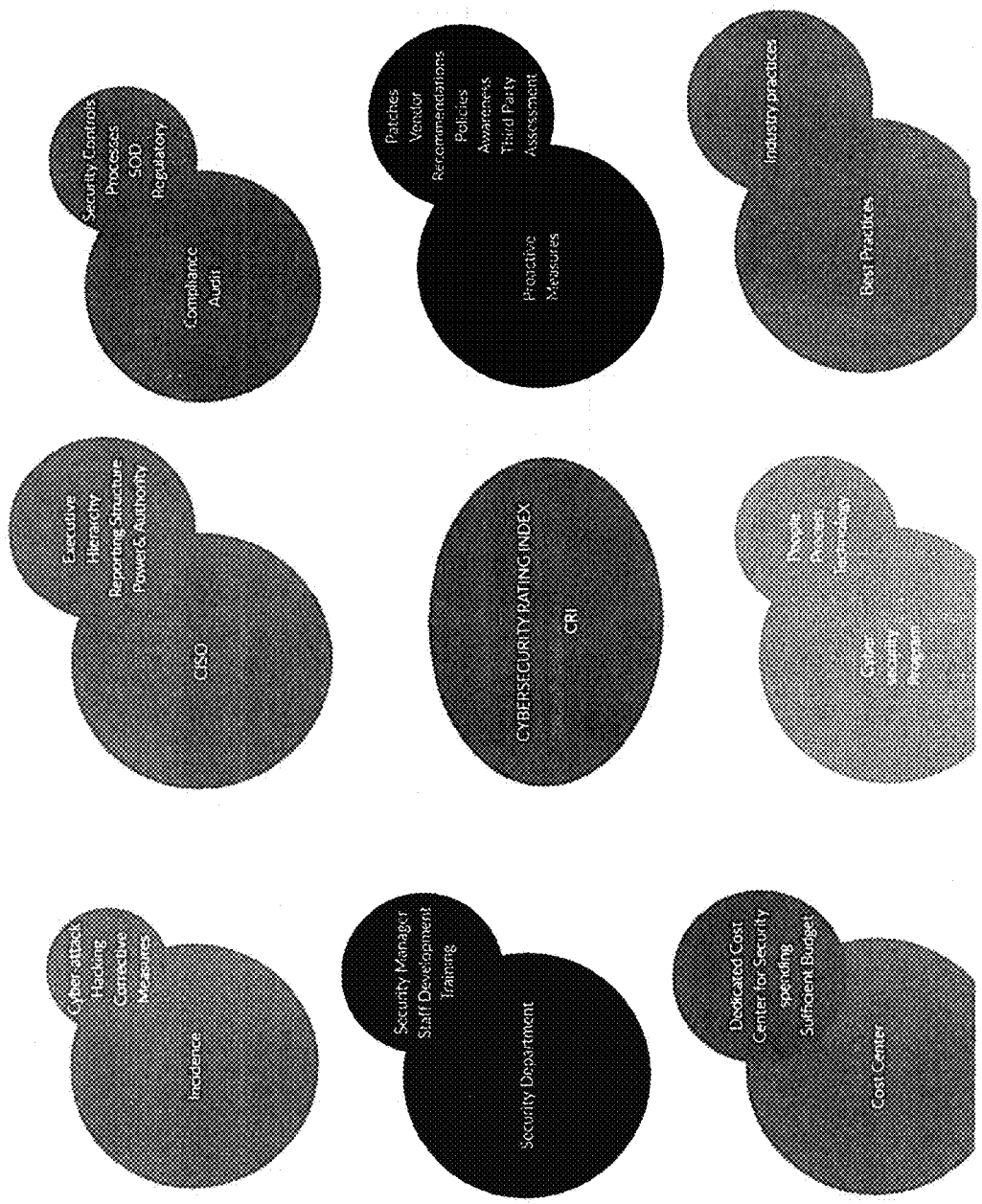
FIG. 12 is a diagram showing evaluation criteria of the method of the present invention.

With reference to FIG. 12, CRI Database and Processes basically include the steps of: Obtain/Extract Data; Extrapolate Data; Gain deeper Insights into organizations; Tabulate the data; and Presents the Data in Text and Visual Form.

Additionally, CRI performs Data Gathering, Data Classification, Data Analysis, Data Synthesis, Data Interpretation, and Data Presentation using Mathematics Techniques, Predictive Analytics and Rating Determination.

Rating Review and Decision portion of the method described herein may comprise a 1st level Review, 2nd level Review, 3rd level Review, Decision Validation, and Vendor Security and Risk Management program. Furthermore, the method is useful for identifying Offshore and Outsourcing firms based on their cybersecurity level; Investors' Confidence Management; Premium holders' security risk management & threat profile; Acquisitions and Merger (Acquired vulnerabilities); and National Cybersecurity and Impact Management.

The system is configured to provide scoring and rating of a cybersecurity level of the user based on specific filtering criteria that includes internal and external threats as well as vulnerabilities.

The system is also configured to provide a comprehensive report that presents a holistic information from different risk categories, internal and external threats, incidence and vulnerabilities.

The system is also configured to provide a cybersecurity monitoring tool monitoring potential threats and vulnerabilities' exploitation on an ongoing basis.

The system is also configured to provide infrastructure and network port scanning with detailed reports.

Standard (Free) tier comprises:
Limited Cyber-Intelligence questionnaire
Cyber Rating Score
Limited report
Small-Medium Business (Professional Tier) comprises:
Comprehensive Cyber-Intelligence Questionnaire
Cyber Rating Score
Risk Assessment Report
Technical Report
Limited Third-party risk assessment report
Dedicated Cybersecurity and Risk Analyst Enterprise Tier comprises:
C-Suite Cybersecurity and Risk Assessment Report
Regulatory and Legislative Compliance Report (e.g. GDPR)
Cyber Rating Score
Risk Assessment Report
Limited Third-party Risk Assessment Report
Dedicated Cybersecurity and Risk Assessment Analyst
Quarterly Risk Assessment Report The present invention described hereinbefore generally relates to measuring a cybersecurity level of a user based on data collected about the user from both the public domain and digital assets which are in use by the user and connected to the Internet. The user provides to the system identifying information which is used to guide or direct the data collection step, at least in regard to public domain data. Additionally, the user provides input to the system to a predetermined questionnaire for further characterising their cybersecurity level. On the basis of both the collected data and the user's answers to the questionnaire, the system is configured to compute a definite and discrete numerical score or rating, representative of the user's level of cybersecurity, which lies within a predetermined range of values such that the score is interpretable by the user and other entities for which the user's cybersecurity level is important, and such that the user's score is comparable against other requestors of cybersecurity ratings via the system.

The scope of the claims should not be limited by the preferred embodiments set forth in the examples but should be given the broadest interpretation consistent with the specification as a whole.

The invention claimed is:

1. A method of deriving a rating representative of a level of cybersecurity of a user comprising:
   requesting, from the user, identifying information about the user, wherein the identifying information about the user includes identifying information about one or more direct associate organizations with which the user conducts business;
   requesting, from each direct associate organization, identifying information about said direct associate organization, wherein the identifying information about said direct associate organization includes identifying information about at least one associate organization with which said direct associate organization conducts business;
   requesting, from the user, input in response to a set of predetermined questions provided to the user based on the identifying information about the user;
   requesting, from each associate organization of a respective one of said one or more direct associate organizations, input in response to a set of predetermined questions provided to said associate organization based on identifying information about said associate organization;
   collecting, based on at least the identifying information about the user, public domain data about the user and data from the user's digital assets;
   collecting, based on at least the identifying information about each associate organization of the respective one of said one or more direct associate organizations, public domain data about said associate organization and data from said associate organization's digital assets;
   computing, based on the collected data about the user and the input to the set of predetermined questions provided by the user, a numerical value defining the cybersecurity rating of the user;

computing, based on the collected data about each associate organization of the respective one of said one or more direct associate organizations and the input to the set of predetermined questions provided by said associate organization, a numerical value representative of a cybersecurity rating for said associate organization; and computing a numerical value representative of an aggregate cybersecurity rating for the user that is based on the cybersecurity rating of the user and the cybersecurity rating of each of said at least one associate organization of each of said one or more associate organizations identified by the user.

2. The method of claim 1 wherein the public domain data about the user and the data from the user's digital assets is also collected based on the input to the set of predetermined questions provided by the user.

3. The method of claim 1 wherein the predetermined questions provided to the user are associated with two or more of the group of question topics consisting of: a domain of the user, a host of the domain, a website of the user, a computer network of the user, risk exposure, threat profile, vulnerabilities, security policies, data classification, regulatory requirements, industry standards, best practices, and prior risk assessment.

4. The method of claim 1 wherein the set of predetermined questions provided to the user is selected based on a user type identified by the user.

5. The method of claim 1 further including:
requesting, from each of said one or more direct associate organization identified by the user, input in response to a set of predetermined questions provided to said direct associate organization based on identifying information about said direct associate organization;
collecting, based on least the identifying information about each direct associate organization, public domain data about the direct associate organization and data from the direct associate organization's digital assets; and
computing, based on the collected data associated with each direct associate organization and the input to the set of predetermined questions provided by the direct associate organization, a numerical value representative of a cybersecurity rating for the direct associate organization.

6. The method of claim 5 further including generating, for the user, an entity map of the one or more direct associate organizations with the cybersecurity rating values thereof indicated on the map.

7. The method of claim 5 wherein the aggregate cybersecurity rating for the user is also based on the cybersecurity rating of each direct associate organization.

8. The method of claim 1 further including generating, based on the collected data about the user, a plurality of different reports about the level of cybersecurity of the user including an executive report and an investor's report.

9. The method of claim 1 further including generating, for the user, a report indicating at least one of:
an industry average cybersecurity rating based on computed cybersecurity rating values for users belonging to a common business industry;
month-to-month history of the user's cybersecurity rating;
history on patching systems based on the collected data;
a predicted cybersecurity rating value for the user based on previously computed cybersecurity rating values over a prescribed period of time;
cybersecurity risk factors for the user determined based on the collected data;
an industry average risk;
industry vulnerabilities;
an indication of a possibility of attack;
a forecast of industry trends for sector specific attacks;
an average patch time for the user;
identification of select ones of the user's digital assets which are endpoints vulnerable to a cyberattack;
size of a network formed by the user's digital assets relative to select ones of the user's digital assets identified as endpoints; and
identification of select ones of the user's digital assets which are infiltration points.

10. The method of claim 1 further including determining, based on the collected data about the user, specific ones of the user's digital assets which are critical to the user's cybersecurity.

11. The method of claim 1 further including identifying, based on the collected data about the user, cybersecurity vulnerabilities of the user.

12. The method of claim 11 further including determining, based on the collected data about the user, an estimated patch time.

13. The method of claim 1 further including recommending, based on the collected data about the user, resolutions to improve the user's cybersecurity.

14. The method of claim 1 further including determining, based on the input to the set of predetermined questions provided by the user, compliance of the user with data or cybersecurity legislation.

15. The method of claim 1 wherein the public domain data about the user and the data about the user's digital assets is periodically recollected to recalculate the numerical value defining the cybersecurity rating of the user using existing input to the set of predetermined questions.

16. The method of claim 1 wherein the identifying information includes at least two of a user's website, a domain of the website, a host of the domain, and a user's business industry.

17. The method of claim 1 wherein the public domain data about the user comprises the user's website.

18. The method of claim 1 wherein the numerical value defining the cybersecurity rating of the user expires after a prescribed time period after a date on which the public domain data about the user and the data about the user's digital assets was collected.

19. The method of claim 1 wherein the numerical value defining the cybersecurity rating of the user lies in a predetermined range having a lower limit and an upper limit.

20. The method of claim 1 further including storing the computed numerical value that is representative of the cybersecurity rating of the user for subsequent retrieval within a prescribed time period after a date on which the public domain data about the user and the data about the user's digital assets was collected.

21. The method of claim 1 wherein requesting, from the user, the identifying information about the user comprises retrieving a stored profile for the user containing the identifying information.

22. The method of claim 1 wherein the collected public domain data about the user comprises data from the dark web.

23. The method of claim 1 wherein the collected data about the user further includes at least one of (i) data associated with business objectives of the user, (ii) intelligence gathered about potential threats to the user, (iii) information about the user's supply chain, and (iv) people of interest to the user.

24. The method of claim 1 wherein the collected data about the user's digital assets includes at least one of (i) detection of malware in the user's digital assets, (ii) strength of authentication to access the user's digital assets, (iii) assessment of the user's secure socket layer, (iv) heartbleed, (v) detection of phishing attacks, (vi) social engineering, and (vii) real-time network monitoring.

25. The method of claim 1 wherein collecting the data about the user's digital assets comprises real-time monitoring of the user's network using a peripheral device operatively connected thereto and operatively communicated with a computer system configured to execute the steps recited in claim 1.

26. The method of claim 1 wherein the input to at least some of the predetermined questions provided to the user is in the form of text entered into a field by the user.

27. The method of claim 1 wherein the input to at least some of the predetermined questions provided to the user is in the form of a user-selection of at least one of a plurality of provided predetermined answers for a respective one of the predetermined questions.

28. The method of claim 1 wherein the step of collecting the public domain data about the user and the data from the user's digital assets is performed in a plurality of serial phases including reconnaissance, enumeration, vulnerability assessment, penetration testing and risk assessment, wherein:
   the reconnaissance phase comprises gathering technical and non-technical data about the user;
   the enumeration phase comprises extracting data from the user's digital assets representative of vulnerabilities in the user's digital assets;
   the vulnerability assessment phase comprises checking predetermined cybersecurity factors indicative of the vulnerabilities of the user's digital assets;
   the penetration testing phase comprises performing predetermined cybersecurity tests on the user's digital assets to measure the user's cybersecurity; and
   the risk assessment phase comprises determining, based on the collected data, susceptibility to a cyberattack.

29. The method of claim 28 wherein the reconnaissance phase comprises gathering at least one of (i) host system information, (ii) geo information, (iii) secure socket layer (SSL) certification, (iv) nmap and operating system (OS) detection, (v) nslookup, (vi) exposed email addresses, (vii) history of the user's domain on blacklists, and (viii) history of the user's domain distributing malware.

30. The method of claim 28 wherein the enumeration phase comprises performing at least one of (i) website security vulnerability header analysis, (ii) Personal Home Page (PHP) vulnerability assessment, (iii) vhost scanning, (iv) exposed files from the user's domain, (v) directory listing and enumeration, (vi) wayback machine scanning for exposed files or information, (vii) subdomain enumeration to identify unintentionally exposed internal directories of the user, and (viii) wordpress scanning.

31. The method of claim 28 wherein the vulnerability assessment phase comprises performing at least one of (i) openSSL heartbleed, (ii) malware distribution and malware infection check, (iii) SSL mitm analysis and verification, (iv) SSL weak or comprised key assessment, (v) XSS scanning and vulnerability assessment, and (vii) Personal Home Page (PHP) weakness testing.

32. The method of claim 28 wherein the penetration testing phase comprises performing at least one of (i) brute force logins and (ii) exploitation analysis.

33. A system for deriving a rating representative of a level of cybersecurity of a user, the system comprising:
   at least one computer processor; and
   a non-transitory readable storage medium having computer readable codes stored thereon which when executed by the at least one computer processor perform the steps of:
   requesting, from the user, identifying information about the user, wherein the identifying information about the user includes identifying information about one or more direct associate organizations with which the user conducts business;
   requesting, from each direct associate organization, identifying information about said direct associate organization, wherein the identifying information about said direct associate organization includes identifying information about at least one associate organization with which said direct associate organization conducts business;
   requesting, from the user, input in response to a set of predetermined questions provided to the user based on the identifying information about the user;
   requesting, from each associate organization of a respective one of said one or more direct associate organizations, input in response to a set of predetermined questions provided to said associate organization based on identifying information about said associate organization;
   collecting, based on at least the identifying information about the user, public domain data about the user and data from the user's digital assets; and
   collecting, based on at least the identifying information about each associate organization of the respective one of said one or more direct associate organizations, public domain data about said associate organization and data from said associate organization's digital assets;
   computing, based on the collected data about the user and the input to the set of predetermined questions provided by the user, a numerical value defining the cybersecurity rating of the user;
   computing, based on the collected data about each associate organization of the respective one of said one or more direct associate organizations and the input to the set of predetermined questions provided by said associate organization, a numerical value representative of a cybersecurity rating for said associate organization; and
   computing a numerical value representative of an aggregate cybersecurity rating for the user that is based on the cybersecurity rating of the user and the cybersecurity rating of each of said at least one associate organization of each of said one or more associate organizations identified by the user.

* * * * *